United States Patent [19]

Endou et al.

[11] 3,849,760

[45] Nov. 19, 1974

[54] MULTI-DIMENSIONAL PATTERN RECOGNITION PROCESSOR

[75] Inventors: Hirohide Endou, Kokubunji; Jun Kawasaki; Yoshiji Fujimoto, both of Hachioji; Keiichi Nakane, Kokubunji; Yoshiaki Kitazume, Sayama, all of Japan

[73] Assignee: Hitachi, Ltd., Tokyo, Japan

[22] Filed: July 11, 1972

[21] Appl. No.: 270,873

[30] Foreign Application Priority Data

July 12, 1971 Japan ............................... 46-51609
Nov. 10, 1971 Japan ............................... 46-89022
Apr. 28, 1972 Japan ............................... 47-42217

[52] U.S. Cl. .......................................... 340/146.3 H
[51] Int. Cl. ............................................ G06k 9/00
[58] Field of Search.... 340/146.3 H, 146.3 Q, 172.5

[56] References Cited

UNITED STATES PATENTS

| | | | |
|---|---|---|---|
| 3,036,775 | 5/1962 | McDermid et al. | 340/146.3 Q |
| 3,614,736 | 10/1971 | McLaughlin | 340/146.3 Q |

*Primary Examiner*—Gareth D. Shaw
*Assistant Examiner*—Joseph M. Thesz, Jr.
*Attorney, Agent, or Firm*—Craig & Antonelli

[57] ABSTRACT

A multi-dimensional pattern recognition processor comprising a pattern data register unit for storing information of a multi-dimensional original pattern, a weight register unit for applying weight information to the original pattern information, and a filtering logic arithmetic unit for carrying out predetermined arithmetic operations (filtering logic) on the original pattern information and weight information stored in and supplied from the respective register units. In the processor, various weight information are employed so as to carry out (1) space coordinate transformation such as rotation, expansion or contraction of the multi-dimensional original pattern, (2) operation for seeking the correlation between the multi-dimensional original pattern and a standard pattern, (3) detection of the geometrical features of the multi-dimensional original pattern, or (4) extraction of the features as to the color and tone of the multi-dimensional original pattern.

7 Claims, 37 Drawing Figures

FIG. 6a
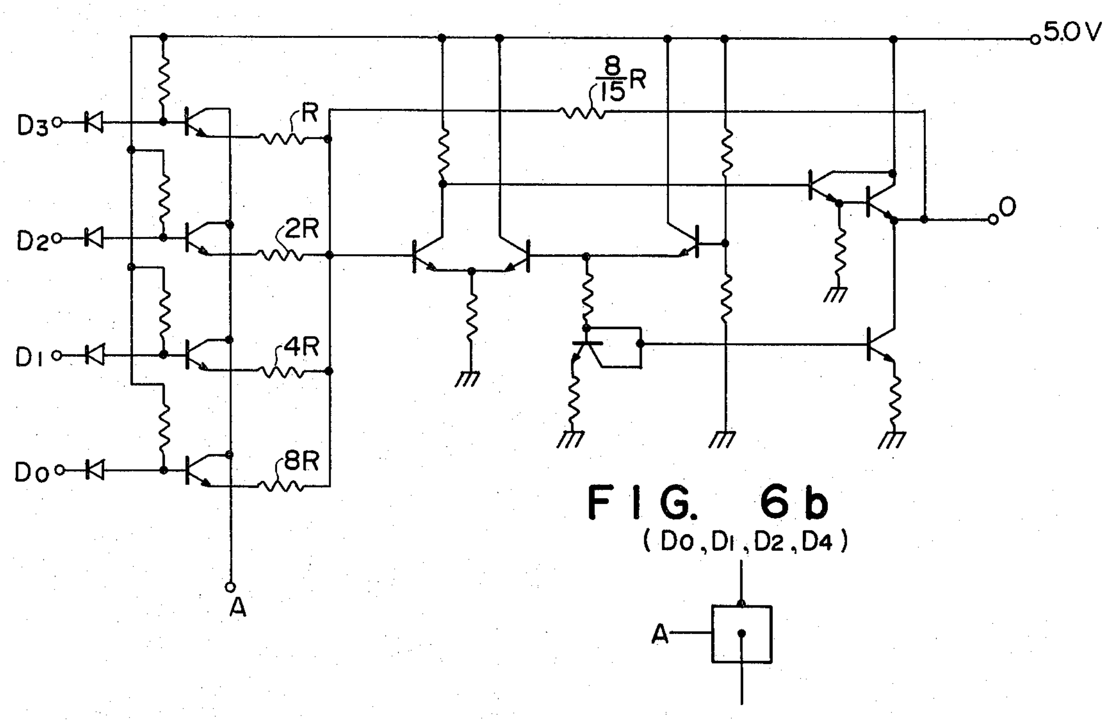
FIG. 6b
FIG. 7a
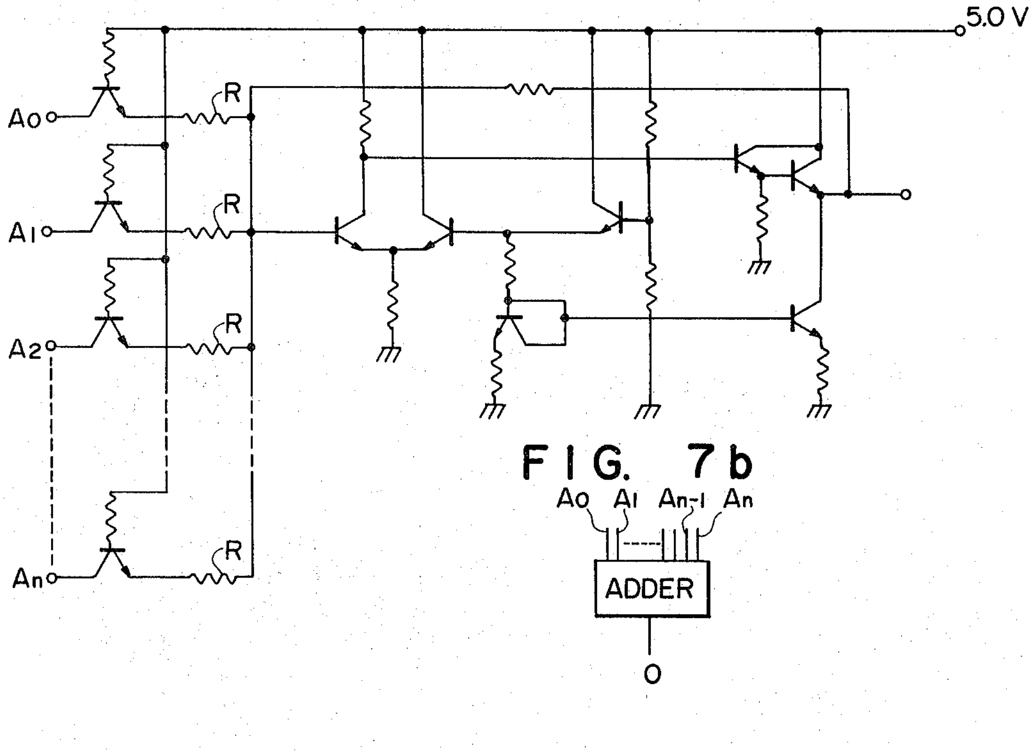
FIG. 7b $$O_{00} = \sum_{i,j=0}^{2} W_{ij} D_{ij} \qquad O_{01} = \sum_{i,j=0}^{2} W_{ij} D_{i,j+1}$$

$$O_{10} = \sum_{i,j=0}^{2} W_{ij} D_{i+1,y} \qquad O_{11} = \sum_{i,j=0}^{2} W_{ij} D_{i+1,j+1}$$

MULTI-DIMENSIONAL PATTERN RECOGNITION PROCESSOR

BACKGROUND OF THE INVENTION

1. Field of the Invention

This invention relates to a multi-dimensional pattern recognition processor for effectively carrying out various modes of pattern information processing which have been difficult to attain with conventional electronic computers used in the field of pattern recognition. More particularly, this invention relates to a processor for carrying out pre-processing of multidimensional pattern information.

2. Description of the Prior Art

Various pattern recognition processors have been proposed in view of the fact that conventional electronic computers are difficult to effectively carry out recognition of patterns. Rotation of a pattern, for example, is generally carried out in the prior art pattern recognition processor as one of the processes for normalization. The rotation is carried out by either a digital processing method or an analog processing method. According to the digital processing method, a special logic circuit comprising various combinations of data registers having a shifting function is employed for carrying out the rotation by sequentially shifting individual picture elements of pattern information toward the desired positions. On the other hand, according to the analog processing method, the coordinates of each individual picture element of pattern information obtained after rotation are computed by means such as a paramatrix and the corresponding picture element of the original pattern information is shifted to the place sought by the computation. However, due to the fact that these methods are considerably sequential, an extremely long period of time is required for the rotation of pattern information.

SUMMARY OF THE INVENTION

It is an object of the present invention to provide a novel and improved multi-dimensional pattern recognition processor which is capable of parallel processing of information and can operate at an extremely high processing speed.

Another object of the present invention is to provide a multi-dimensional pattern recognition processor which can easily carry out space coordinate transformation (affine transformation) of multi-dimensional pattern information.

A further object of the present invention is to provide a multi-dimensional pattern recognition processor which can easily seek the correlation between multi-dimensional original pattern information and weight information designating the weight applied to the original pattern information.

Still another object of the present invention is to provide a multi-dimensional pattern recognition processor which can easily detect the geometrical features of multi-dimensional pattern information.

Yet another object of the present invention is to provide a mutli-dimensional pattern recognition processor which can easily extract the features as to the color and tone of multi-dimensional pattern information.

In accordance with the present invention which attains the above objects, there is provided, a multi-dimensional pattern recognition processor comprising a pattern data register unit for storing information of individual picture elements of an original pattern, a weight or mask register unit for designating the weight applied to the pattern information of the individual picture elements of the original pattern, a plurality of multiplier groups for simultaneously carrying out the multiplication on all the picture elements of the original pattern such that pattern information signals representative of the picture elements of the original pattern derived from said pattern data register unit are multiplied by weight information signals derived from the corresponding picture element portions of said weight or mask register unit, and a plurality of adder groups each associated with one of said multiplier groups for carrying out the addition of the results of multiplication by said multiplier groups.

However, such a digital system involves a few problems as described below and is not necessarily satisfactory.

1. In such a digital system, one digital circuit can only process one bit and one wire can commonly transfer one-bit information only. Thus, the information processing density per unit circuit and per unit space is extremely low. Therefore, a great number of circuits and bulky equipment are required for handling a great number of pattern information, resulting in various drawbacks including the lack of reliability.

2. For a pattern recognition processor, the features of the entire system are important rather than the ability to accurately process information one bit by one bit. Therefore, macroscopic processing rather than microscopic processing must be carried out at high speeds. From this viewpoint, conventional digital circuits and systems are not suitable for the purpose. Further, a great number of digital circuits are required for carrying out arithmetic operation in analog fashion, for example, arithmetic operation required for normalization of patterns such as rotation of patterns.

An analog system also involves various problems as described below.

1. Since an analog system is not provided with elements for effectively storing analog values, analog processing of stored data in well matched relation with the data is generally difficult to attain.

2. Analog processing is generally unsatisfactory in versatility or universality compared with digital processing.

3. An analog circuit has an inherent limit in precision and it is difficult to expect processing of information of more than 10 bits with high precision.

4. Integration of high precision analog circuits is technically extremely difficult.

It is therefore another object of the present invention to provide a multi-dimensional pattern recognition processor employing a hybrid arithmetic operation circuit system effectively utilizing the advantages of both the digital circuit system and the analog circuit system above described.

A further object of the present invention is to provide a multi-dimensional pattern recognition processor which is sufficiently versatile by virtue of the employment of the hybrid system.

In order to attain the above objects, the present invention employs a construction in which the concept of hybrid is extended to the circuit level. A conventional hybrid computer is intended to effectively exhibit both the features of an analog computer and a digital computer, and in this respect, the present invention is based on the same concept as the concept of the conventional hybrid computer. However, the present invention differs from the prior art concept in that it is featured by the fact that the concept of hybrid is extended to the circuit level so as to facilitate the multi-dimensional pattern recognition by such hybrid circuits.

Such a multi-dimensional pattern recognition processor comprises a pattern data register unit for storing information of individual picture elements of an original pattern, a weight or mask register unit for designating the weight applied to the pattern information of the individual picture elements of the original pattern, a plurality of hybrid multiplier groups connected to said register units for computing the product of two input signals representative of a multiplier and a multiplicand one of which is a digital signal and the other of which is an analog signal, a plurality of analog adder groups each connected to one of said hybrid multiplier groups for carrying out the addition of an addend and a summand both of which are analog signals, and a group of analog-ditigal converters each converting the analog output signal of one of said adder groups into a digital signal.

In the two forms of the processor above described, weight information in the form of a square in its planar shape is employed, but the square-shaped weight information includes information unnecessary for the rotation, expansion, contraction or superposition of pattern information. Therefore, the arithmetic unit includes unnecessary arithmetic operation circuits and is relatively expensive. Such arithmetic unit is not necessarily satisfactory for practical use.

It is therefore another object of the present invention to provide a multi-dimensional pattern recognition processor employing weight information having a more effective two-dimensional shape.

For example, one form of the effective weight information preferably employed in the multi-dimensional pattern recognition processor according to the present invention has a planar shape comprising a central picture element, a plurality of picture elements lying along a pair of concentric partial circles drawn around one of the end points of the information and passing through opposite ones of the corners of the central picture element, a plurality of picture elements lying along a straight line passing through the central picture element in orthogonal relation to the partial circles, and a plurality of picture elements adjoining to the picture elements above described. The use of the weight information having such a shape for the arithmetic operation for seeking the product and sum of the weight information and multi-dimensional pattern information is advantageous in very inexpensively and effectively attaining the space coordinate transformation such as the rotation, expansion or contraction of the pattern information or detection of the geometrical features of the multi-dimensional pattern information.

Another form of the weight information preferably employed in the present invention has such a two-dimensional shape that at least one additional picture element is provided at suitable position on the side of the original shape. The use of the weight information having such a shape for the arithmetic operation for seeking the product and sum of the weight information and multi-dimensional pattern information is advantageous in very easily, inexpensively and effectively attaining the superposition such as the addition and substraction between the multi-dimensional pattern information.

It is a further object of the present invention to provide a multi-dimensional pattern recognition processor which can be easily integrated.

Figure 4:
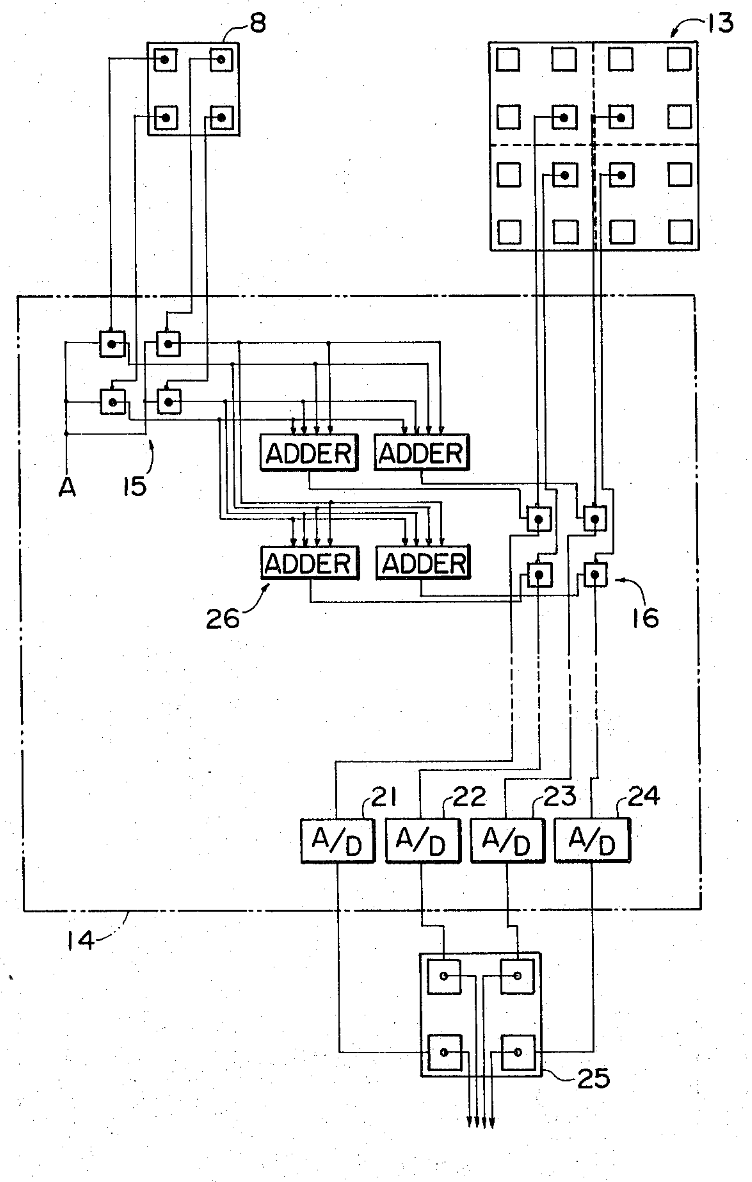
FIG. 4 is a diagrammatic view showing the structure of another form of the filtering logic arithmetic unit preferably used in the processor according to the present invention.

FIGS. *5a* and *5b* are partial detail views of the filtering logic arithmetic unit shown in FIG. 4.

FIGS. *6a* and *6b* are a circuit diagram of a hybrid analog-digital multiplier used in the filtering logic arithmetic unit, and the symbol of such multiplier respectively.

FIGS. *7a* and *7b* are a circuit diagram of an analog adder used in the filtering logic arithmetic unit and the symbol of such adder respectively.

FIGS. *8a* and *8b* are a circuit diagram of a parallel analog-digital converter used in the filtering logic arithmetic unit and the symbol of such converter respectively.

FIGS. *9a* and *9b* are a circuit diagram of a digital latch register unit used in the filtering logic arithmetic unit and the symbol of such register unit respectively.

Figure 10:
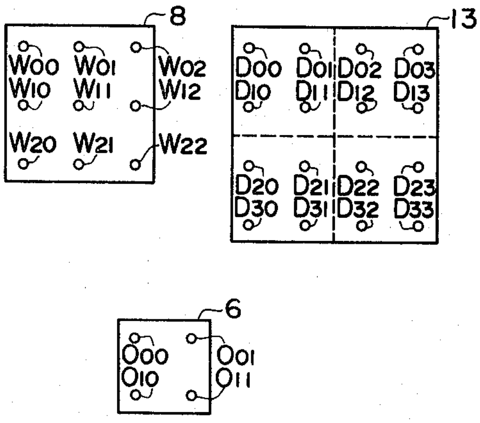

FIG. 10 shows the relation between original pattern information and weight information employed in the processor according to the present invention.

Figure 3:
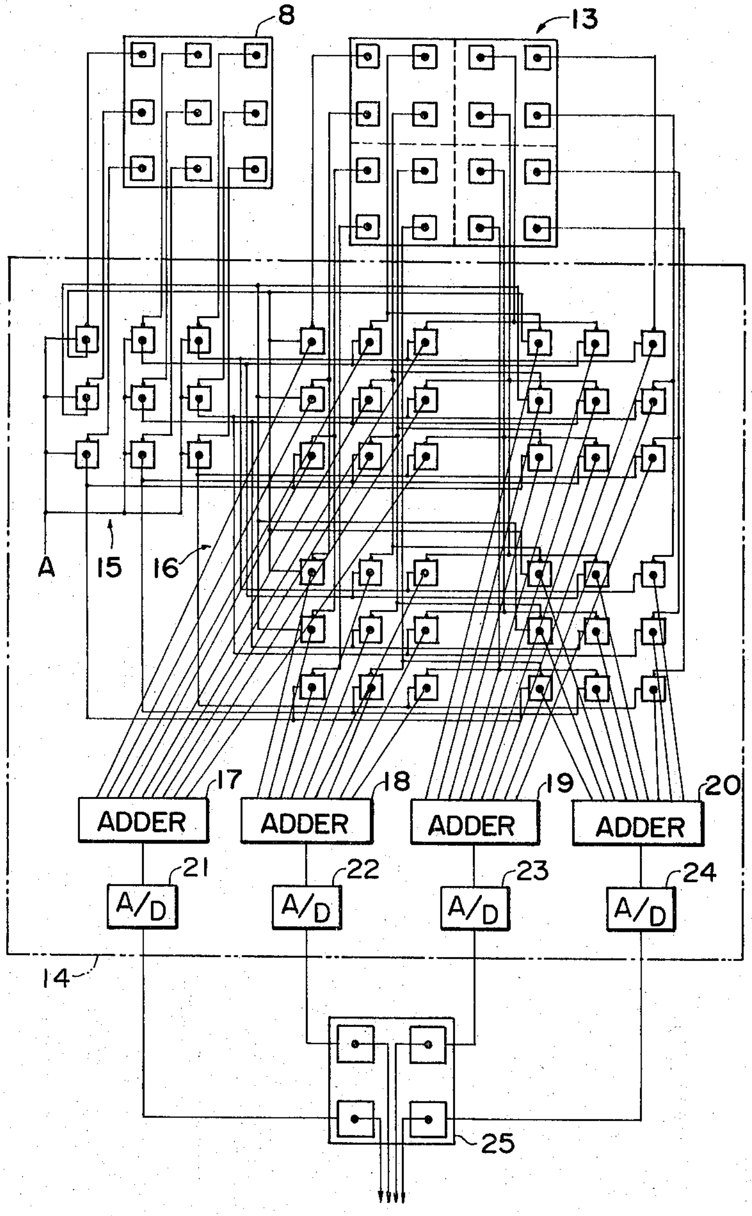
FIG. 3 is a diagrammatic view showing the structure of one form of a filtering logic arithmetic unit preferably used in the processor according to the present invention.
Figure 11:
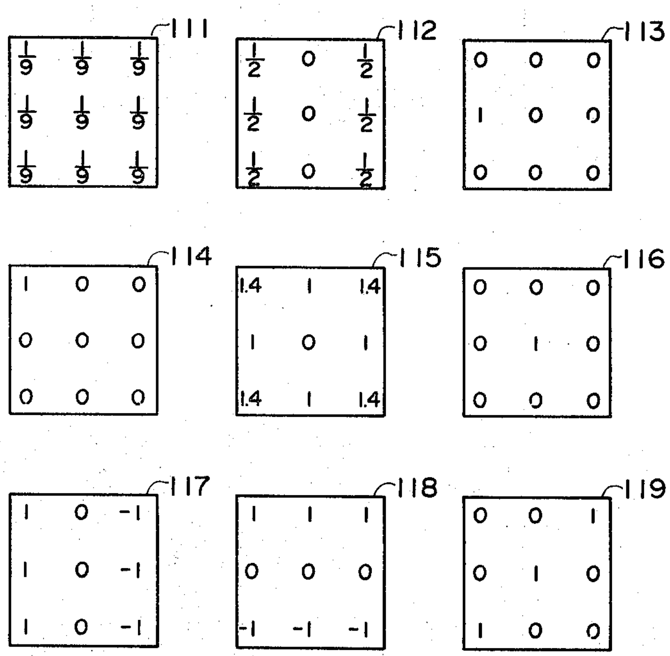

FIG. 11 shows some practical examples of the weight information employed in the embodiment shown in FIG. 3.

Figure 12:
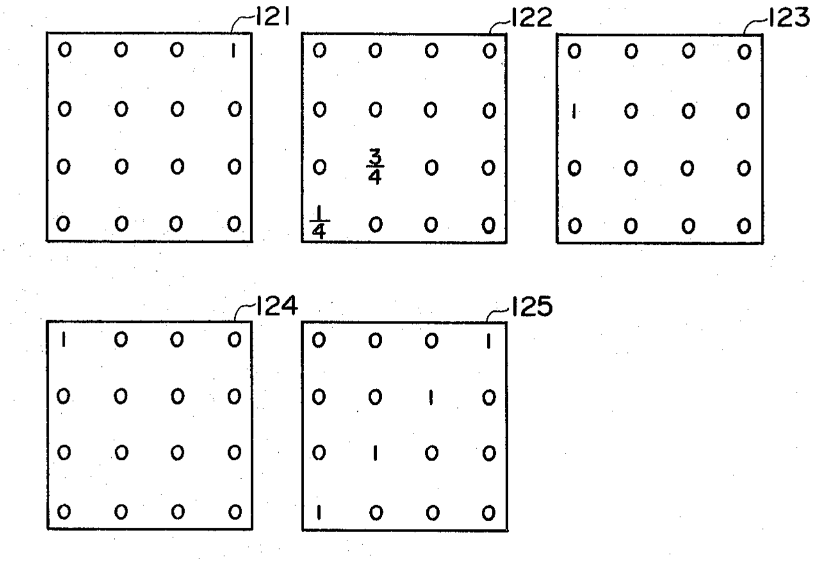

FIG. 12 shows some practical examples of the weight information employed in the embodiment shown in FIG. 4.

Figure 13:
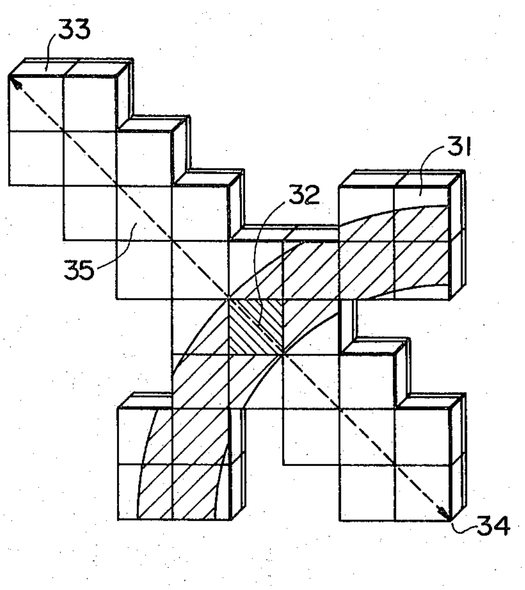

FIG. 13 shows the planar shape of one form of the weight information employed in the processor according to the present invention.

Figure 14:
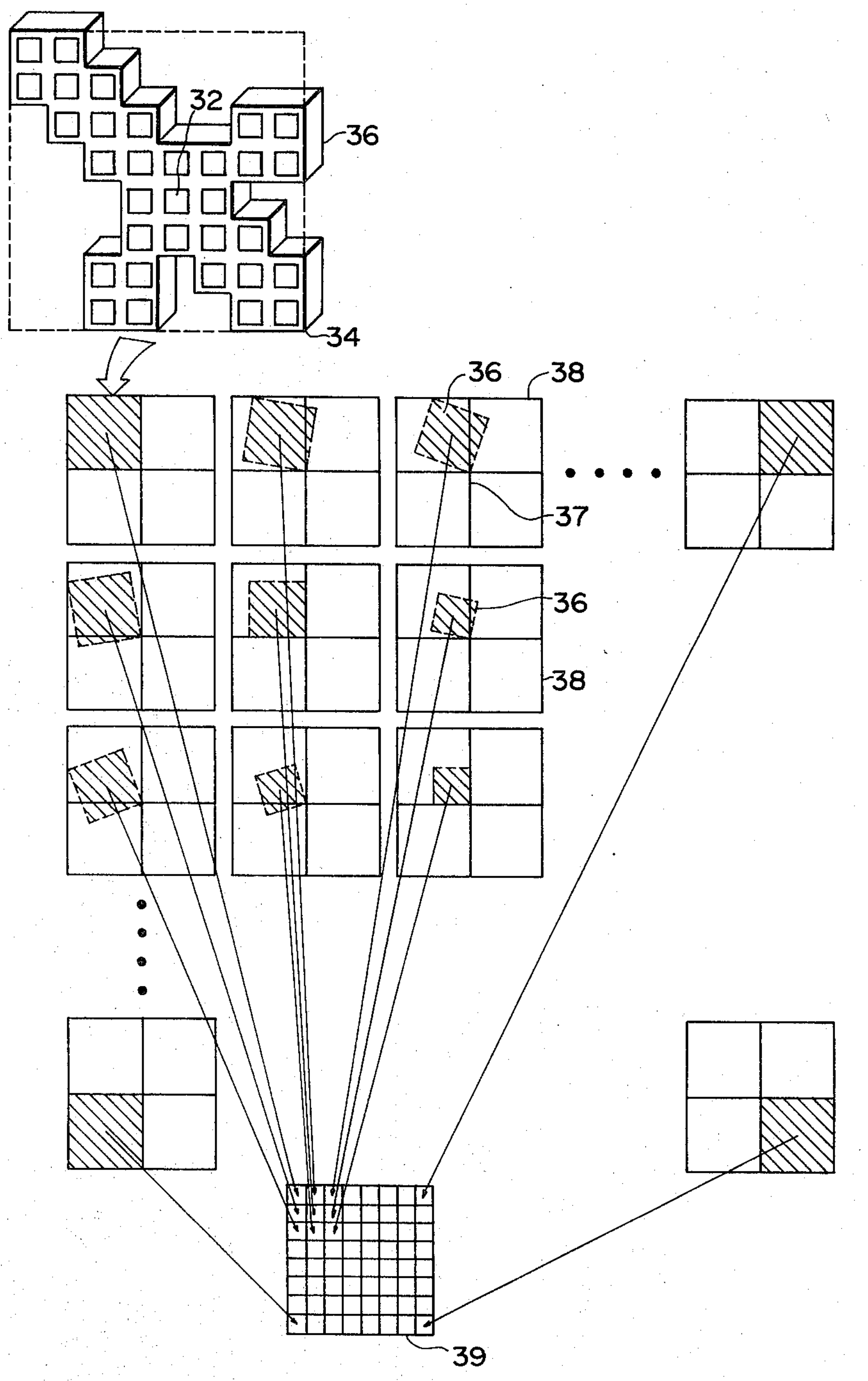

FIG. 14 shows schematically the manner of filtering logic arithmetic operation carried out in the filtering logic arithmetic unit.

Figure 15:
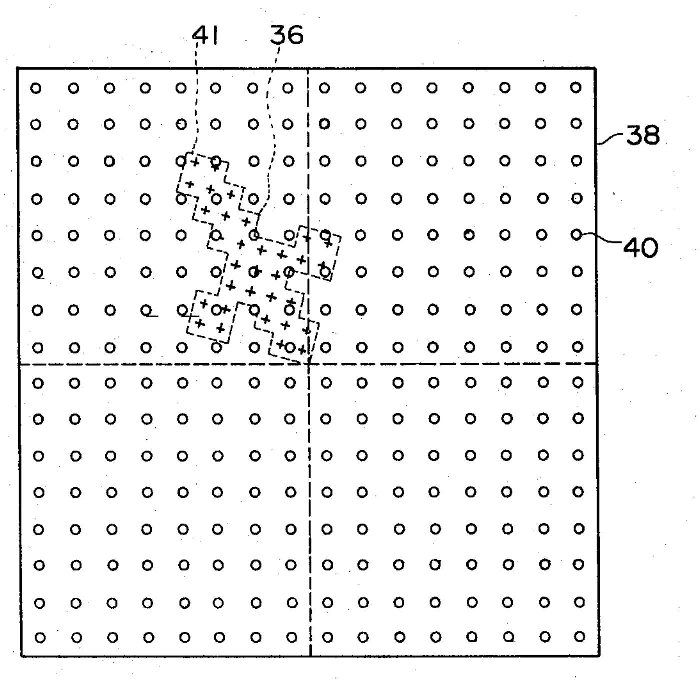

FIG. 15 shows the relative positions of the weight information and the original pattern information shown in FIG. 13.

Figure 16:
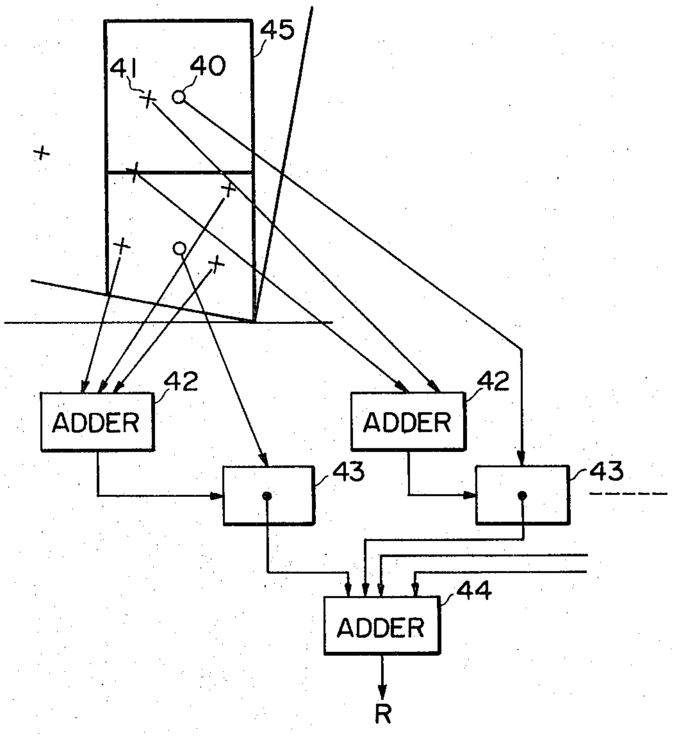

FIG. 16 is a view similar to FIG. 5, but showing an enlarged view of a part of FIG. 15 and a part of circuitry for seeking the results of the filtering logic arithmetic operation carried out in the relation shown in FIG. 15.

Figure 17:
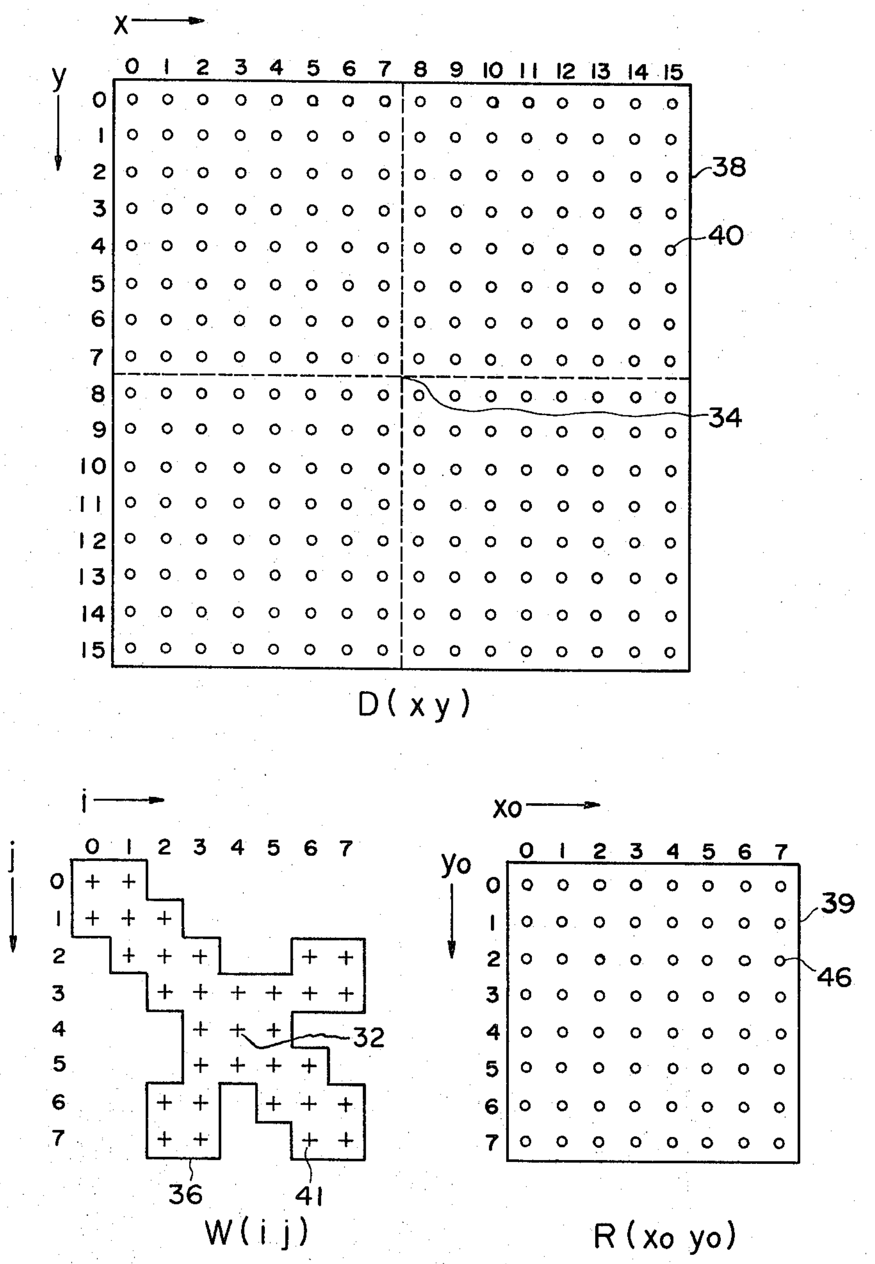

FIG. 17 shows the coordinate systems of the pattern information, weight information (shown in FIG. 13) and resultant information respectively employed in and obtained by the processor according to the present invention.

Figure 18:
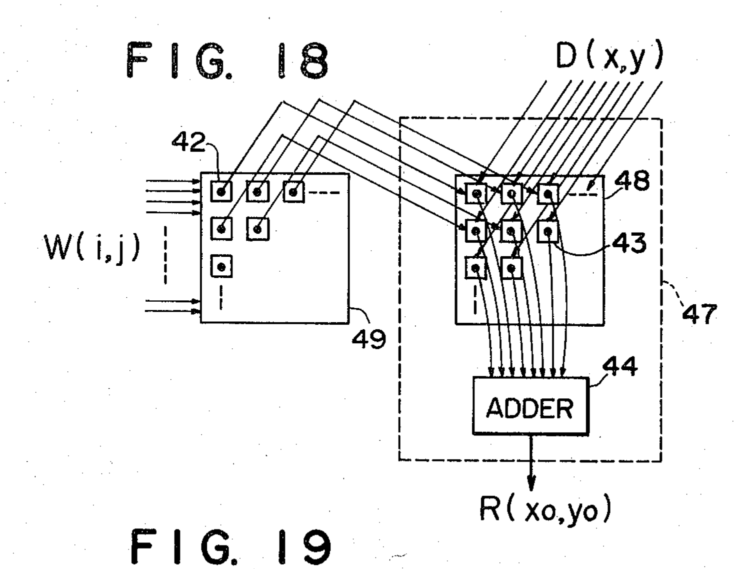

FIG. 18 is a view similar to FIG. 4, but showing in detail the structure of the part of the filtering logic arithmetic unit.

Figure 19:
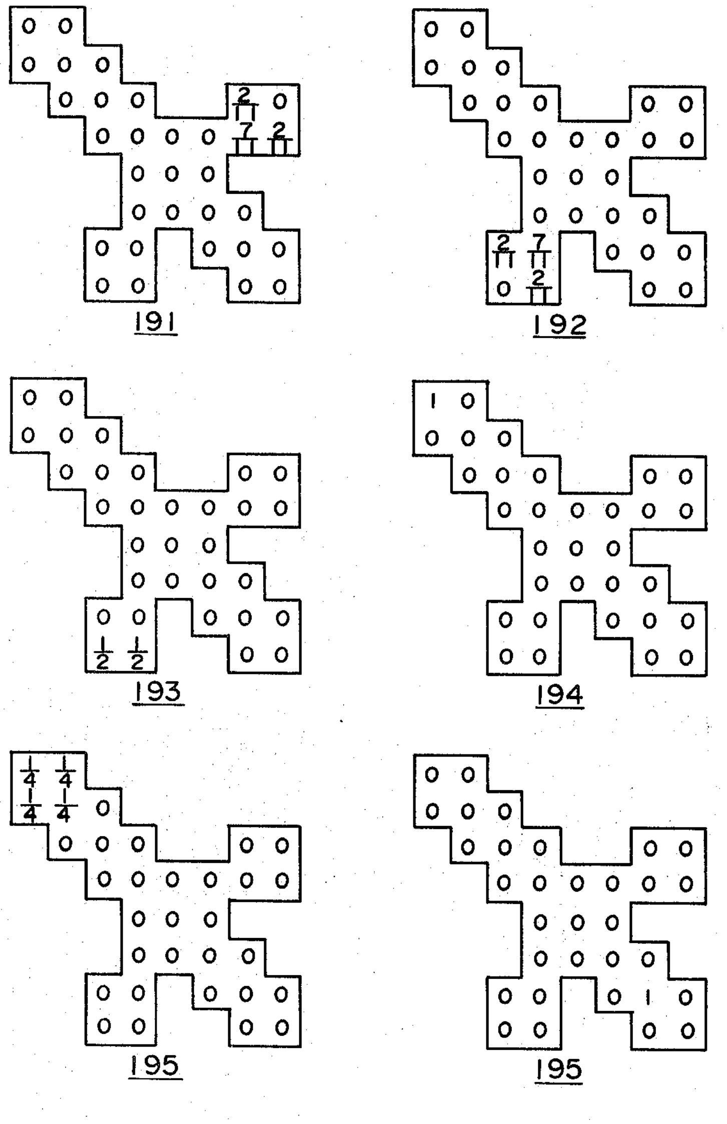

FIG. 19 shows some practical examples of the weight information shown in FIG. 13.

Figure 20A:
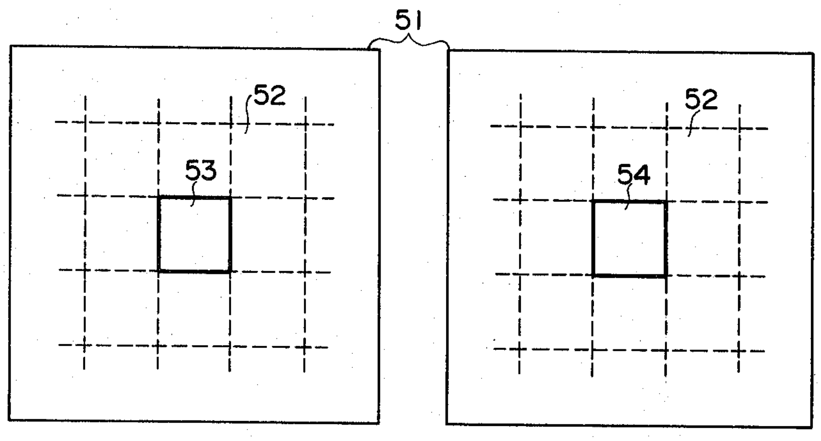
Figure 20B:
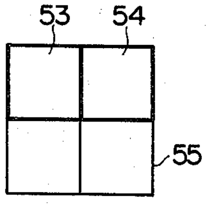
Figure 20C:
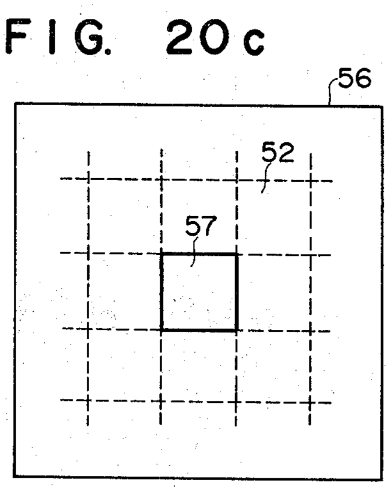

FIGS. 20a, 20b and 20c show the principle of superposition or the like carried out by the processor according to the present invention.

Figure 21:
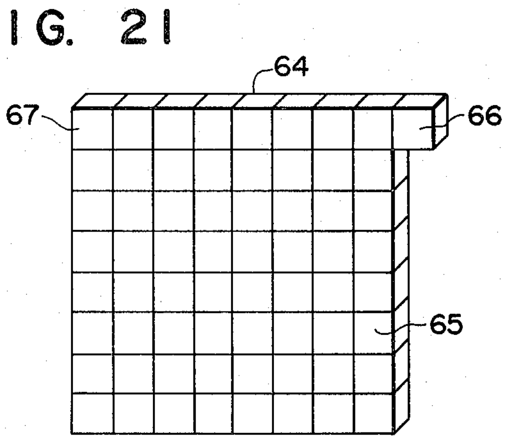

FIG. 21 is a view similar to FIG. 13, but showing the planar shape of another form of the weight information.

Figure 22:
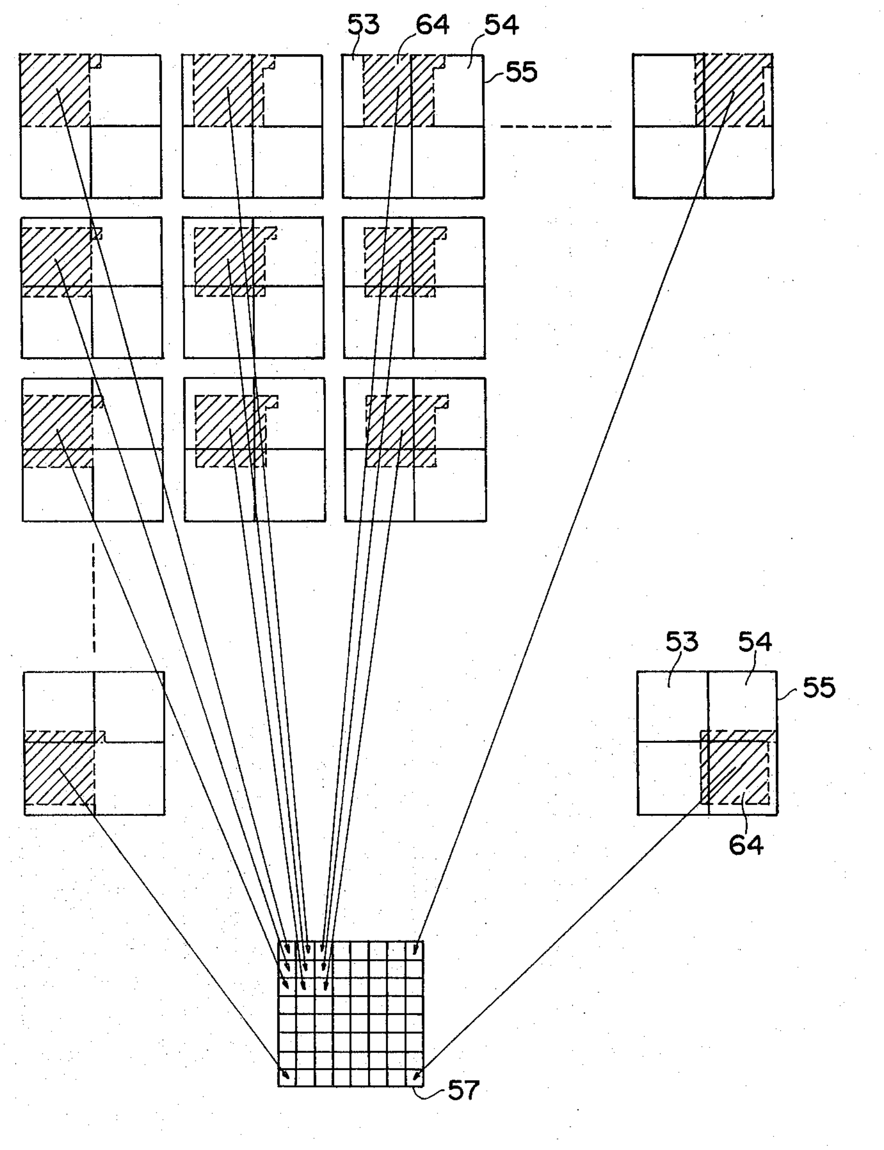

FIG. 22 is a view similar to FIG. 14, but showing schematically the different manner of filtering logic arithmetic operation carried out by the filtering logic arithmetic unit.

Figure 23A:
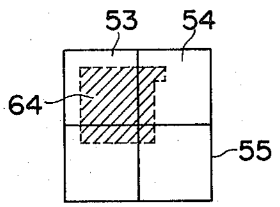
Figure 23B:
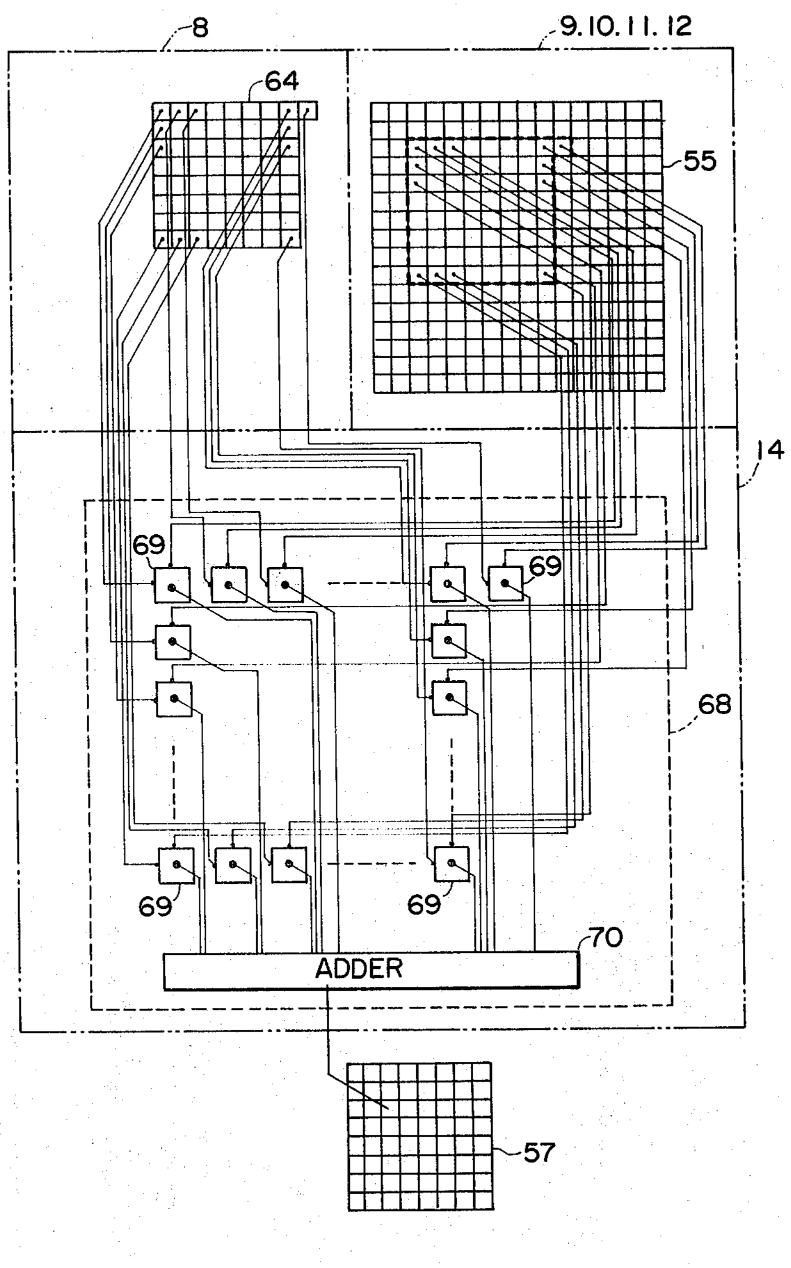

FIGS. 23a and 23b are a partial view of FIG. 22 and a view similar to FIG. 3 respectively, but showing a part of another circuitry for seeking the results of the filtering logic arithmetic operation.

Figure 24:
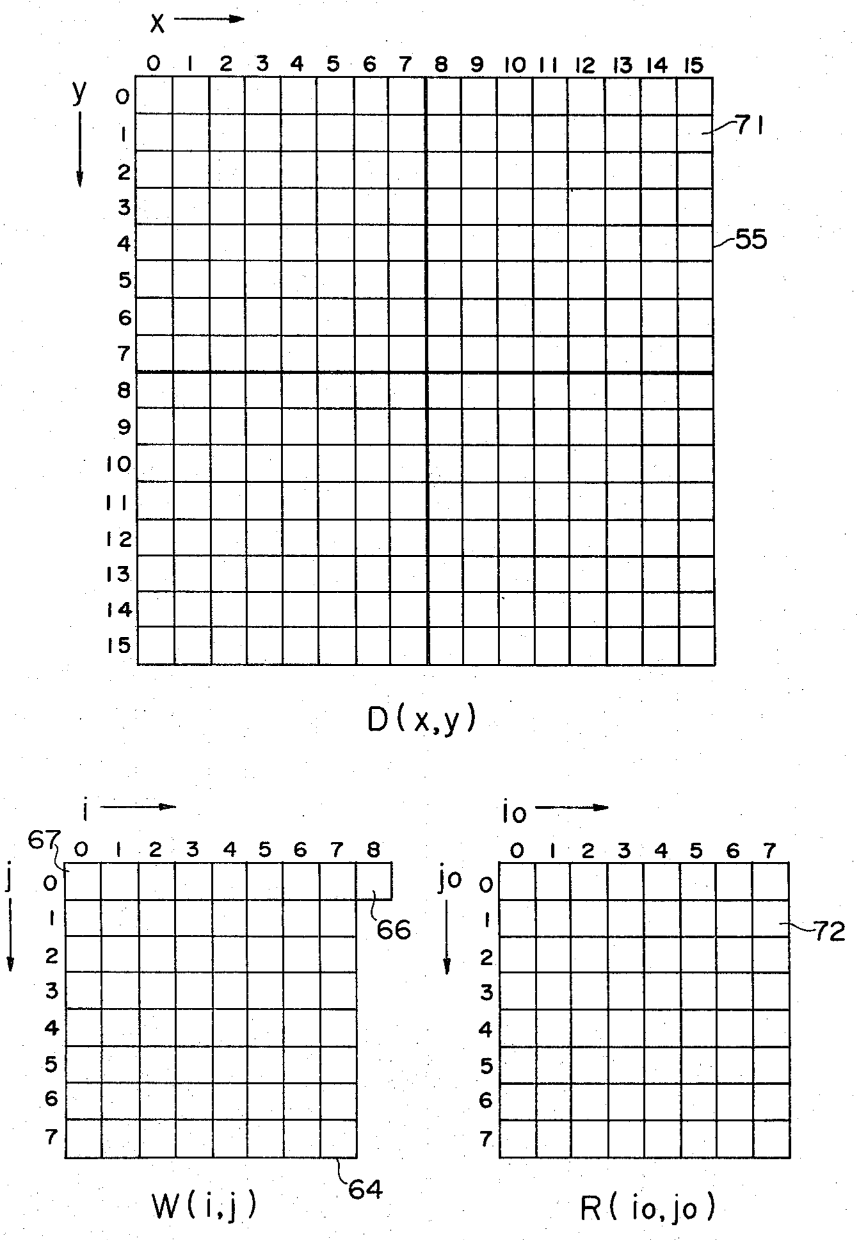

FIG. 24 is a view similar to FIG. 17, but showing the coordinate systems of the pattern information, weight information (shown in FIG. 21) and resultant information respectively.

Figure 25:
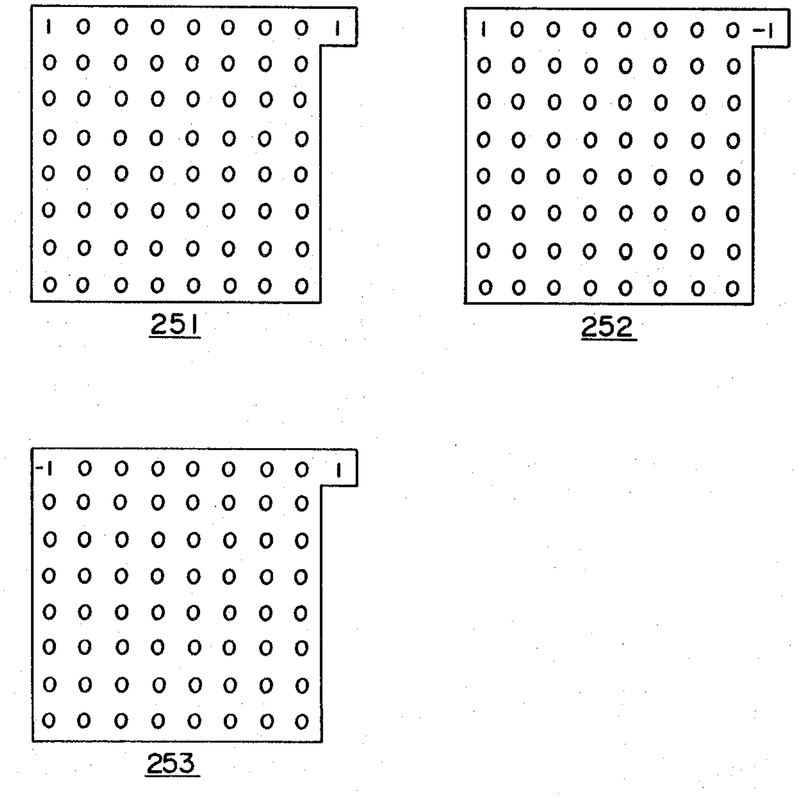

FIG. 25 shows some practical examples of the weight information shown in FIG. 21.

Figure 26:
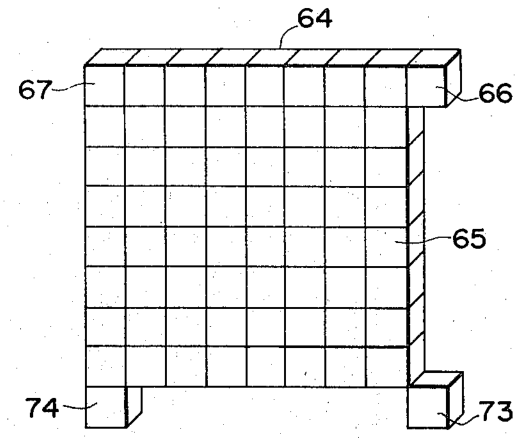

FIG. 26 is a view similar to FIG. 21, but showing the planar shape of another form of the weight information.

Figure 27:
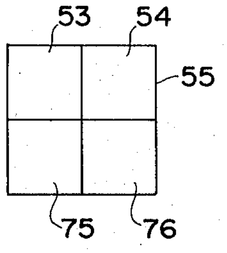

FIG. 27 shows the arrangement of four kinds of pattern information during the superposition of these information according to the filtering logic.

Figure 28:
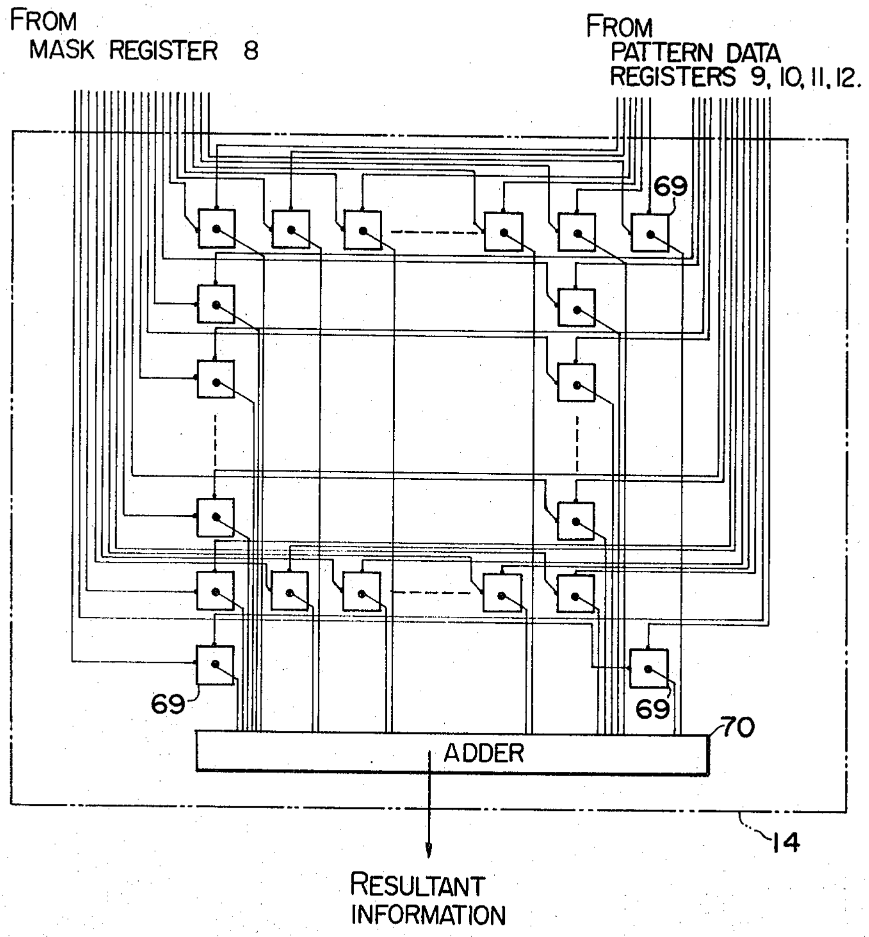

FIG. 28 is a view similar to FIG. 23, but showing a part of another circuitry for seeking the results of the filtering logic arithmetic operation.

Figure 29:
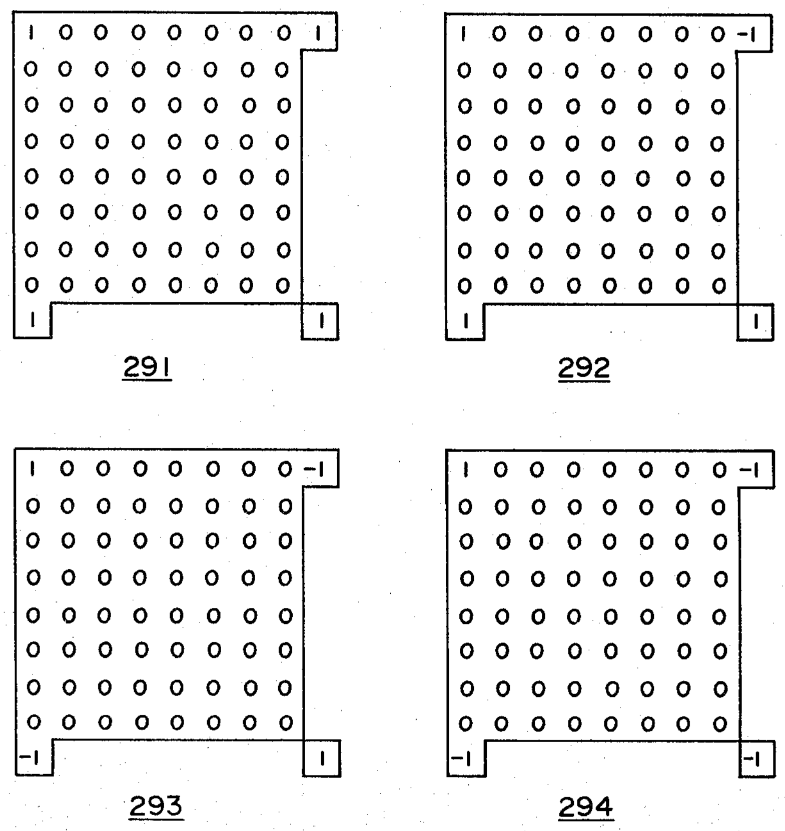

FIG. 29 shows some practical examples of the weight information shown in FIG. 26.

DESCRIPTION OF THE PREFERRED EMBODIMENTS

Figure 1:
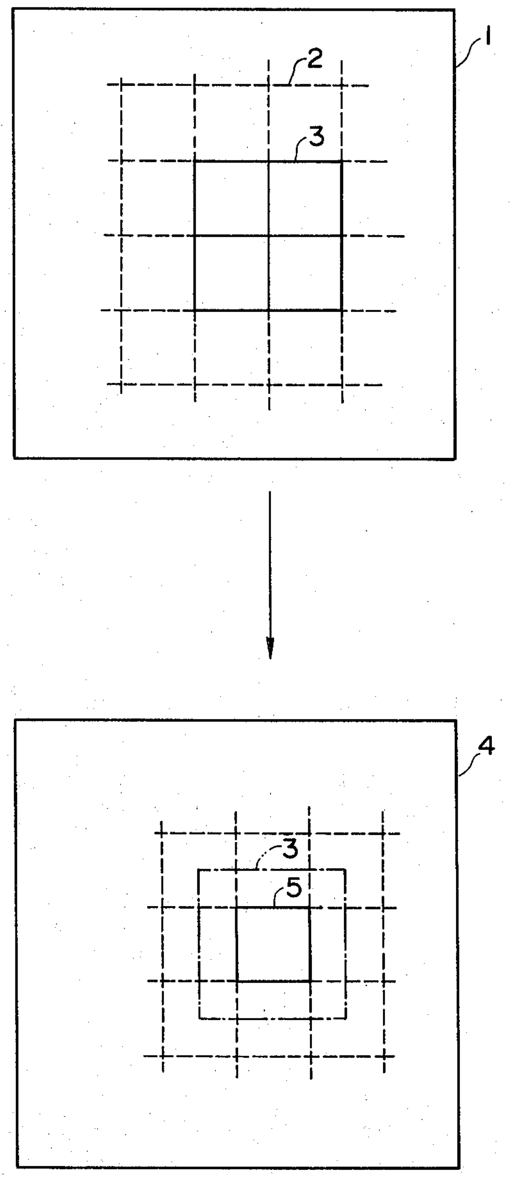
FIG. 1 is a schematic view showing the principle of processing of multi-dimensional pattern information according to the present invention.

FIG. 1 is a schematic view showing the principle of processing of multi-dimensional pattern information according to the present invention. FIG 1 shows the relation between one frame portion of non-processed pattern information or original pattern information 1 stored in a data register and the corresponding portion of pattern information 4 obtained after processing according to the present invention. The reference numeral 2 designates one unit of the pattern information to be processed according to the present invention. Each unit 2 consists of, for example, 8 × 8 picture elements, and parallel processing of a plurality of units each consisting of 8 × 8 picture elements is carried out in an embodiment of the present invention. Each picture element consists of tone information of, for example, 4 to 8 bits. The reference numeral 5 designates resultant pattern information obtained as a result of processing on a range 3 of the original pattern information 1. It will be seen that the processing provides the resultant pattern information 5 consisting of 8 × 8 picture elements. In order to obtain the resultant pattern information 5 consisting of 8 × 8 picture elements by the processing, it is necessary to simultaneously process the original pattern information in the range 3 which includes 16 × 16 picture elements. This is because processing on only the unit 2 of the original pattern information consisting of 8 × 8 picture elements leads necessarily to drop-out of portions of the original pattern information except the central portion within the range 5 and an ambiguous result is produced.

Figure 2:
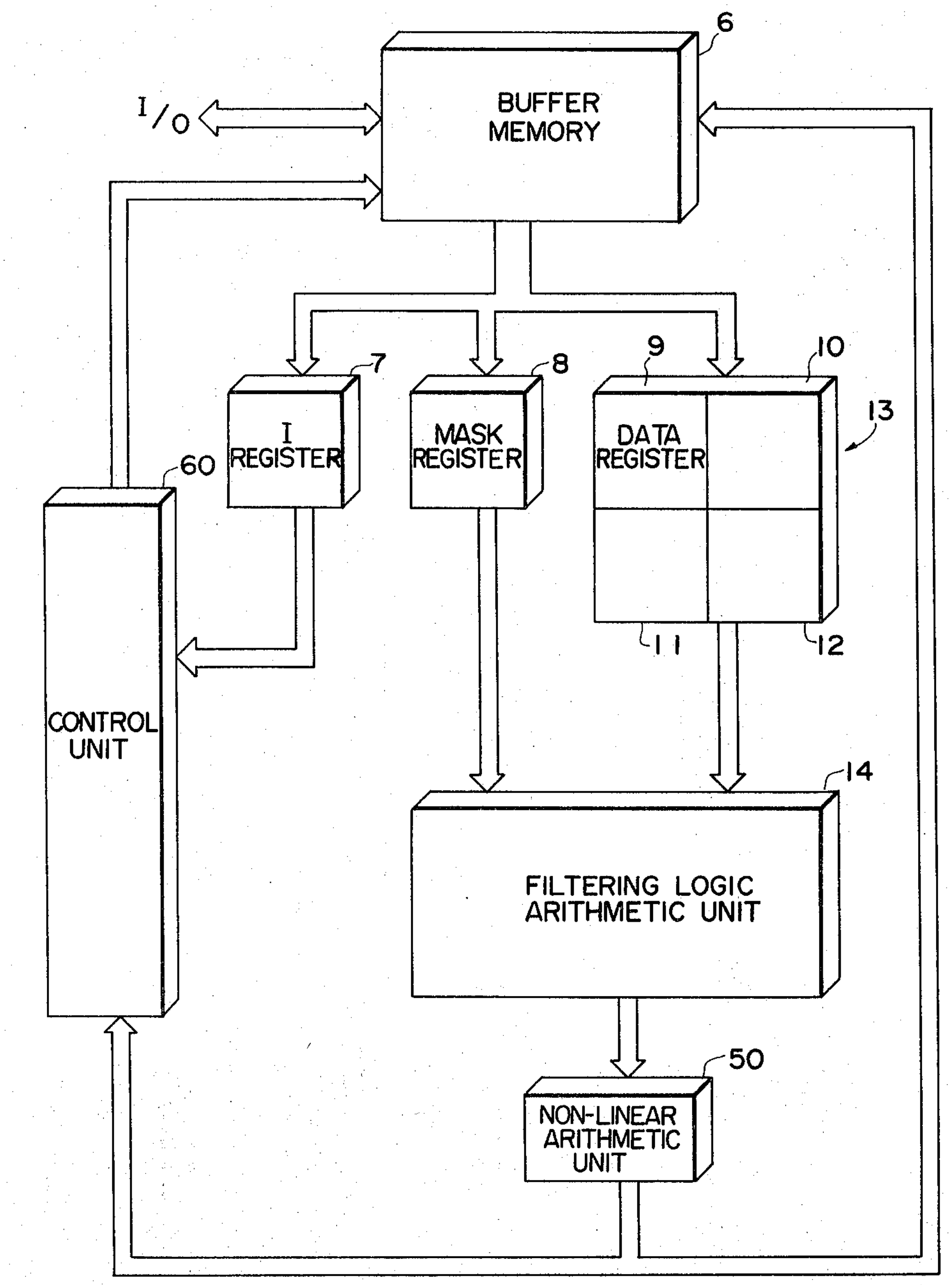
FIG. 2 is a block diagram schematically showing the structure of a multi-dimensional pattern recognition processor embodying the present invention.

FIG. 2 shows diagrammatically the structure of a multi-dimensional pattern recognition processor of the pressure invention adapted for carrying out processing of pattern information as described with reference to FIG. 1.

Basically, the processor comprises a pattern data register unit 13 consisting of a plurality of data registers 9, 10, 11 and 12 for storing original pattern information therein, a mask register unit or weight register unit 8 for designating the weight applied to individual picture elements of the original pattern information, a filtering logic arithmetic unit 14 for carrying out filtering logic arithmetic operations as described later between the original pattern information and weight information, and a memory or buffer memory 6 for storing the results of the filtering logic arithmetic operations. The buffer memory 6 is adapted for connection to various input-output units, and a non-linear arithmetic unit 50 may be disposed between the buffer memory 6 and the filtering logic arithmetic unit 14 as required.

The processor is analogous to conventional electronic computers in construction. An I-register (Instruction register) 7, the mask register unit 8 and the data register unit 13, and the filtering logic arithmetic unit 14 and the non-linear arithmetic unit 50 in the processor correspond to the instruction register, general purpose register and arithmetic unit of the conventional computer respectively. However, for the reasons above described, all the arithmetic operations are carried out in parallel relation in this processor on a plurality of unit information each consisting of, for example, 8 × 8 picture elements.

The operation of the processor according to the present invention will now be briefly described. The portion 3 of the original pattern information 1 shown in FIG. 1 is set in the data register unit 13 from the buffer memory 6. The mask register unit 8 has normally a capacity of 8 × 8 picture elements, but its capacity is expanded to 9 × 9 picture elements during the addition and subtraction between pattern information described later. Various patterns are set in the mask register unit 8 depending on the kind of processing such as rotation, contraction or expansion carried out on the original pattern infformation. (Refer to FIG. 11.) The contents of the mask register unit 8 and data registers 9, 10, 11 and 12 are supplied to the filtering logic arithmetic unit 14 to be subjected to the filtering logic arithmetic operations described later. The results of the above operations may then be supplied to the non-linear arithmetic unit 50 to be subjected to the desired non-linear arithmetic operation as required, and then, the resultant pattern information is stored in the buffer memory 6. The non-linear arithmetic unit 50 is provided when, for example, it is desired to extract the geometrical features of a pattern. The non-linear arithmetic unit 50 selects signal values higher than a predetermined threshold value only from the output signal of the filtering logic arithmetic unit 14 so as to extract the geometrical features of the pattern. Thus, when the threshold value is selected to be maximum, the output signal values higher than the maximum value can only be selected. The output signal values lower than a minimum may solely be selected if desired.

EMBODIMENT 1

In a first embodiment of the present invention, the filtering logic arithmetic unit 14 is in the form of a hybrid arithmetic unit capable of carrying out arithmetic operations at high speeds. In this embodiment, weight information and original pattern information are applied in the form of an analog signal and a digital signal respectively to the filtering logic arithmetic unit 14.

FIGS. 3 and 4 shown in detail two forms of the filtering logic arithmetic unit 14. More precisely, FIG. 3 shows diagrammatically the structure of one form of the filtring logic arithmetic unit 14 preferably used in the processor according to the present invention. FIG. 4 shows diagrammatically the structure of another form of the filtering logic arithmetic unit 14 of the polar coordinate type preferably used in the processor according to the present invention.

Referring to FIG. 3, the weight register unit 8 and pattern data register unit 13 are composed of a plurality of latch registers as shown in FIG. 9. A plurality of multiplier groups 15 and 16 are provided for seeking the product of the analog signal and the digital signal and each multiplier is in the form of a hybrid arithmetic operation circuit having a structure as shown in FIG. 6. A plurality of analog adders 17, 18, 19 and 20 have a structure as shown in FIG. 7, and a plurality of analog-digital (A/D) converters 21, 22, 23 and 24 have a structure as shown in FIG. 8.

The hybrid arithmetic operation circuit is a conventional one as shown in FIG. 6*a*. A plurality of digital input signals $D_0$, $D_1$, $D_2$ and $D_3$ representative of tones of 16 different levels and an analog input signal A are applied to the circuit. Each digital input signal is a binary signal representative of "0" or "1". Therefore, an output signal representative of $A(D_0 + ½D_1 + ¼D_2 + ⅛D_3)$ appears at an output terminal 0 of this circuit. FIG. 6*b* shows the symbol of the circuit shown in FIG. 6*a*, and this symbol is used in FIGS. 3, 4 and 5.

The analog adder is a conventional one as shown in FIG. 7*a*. A plurality of analog input signals $A_0$, $A_1$, $A_2$, . . . . $A_n$ are applied to the analog adder. Therefore, an output signal representative of $(A_0 + A_1 + A_2 + \ldots A_n)$ appears at an output terminal 0 of this adder. FIG. 7*b* shows the symbol of the adder shown in FIG. 7*a* and this symbol is used in FIGS. 3, 4 and 5.

Figure 8A:
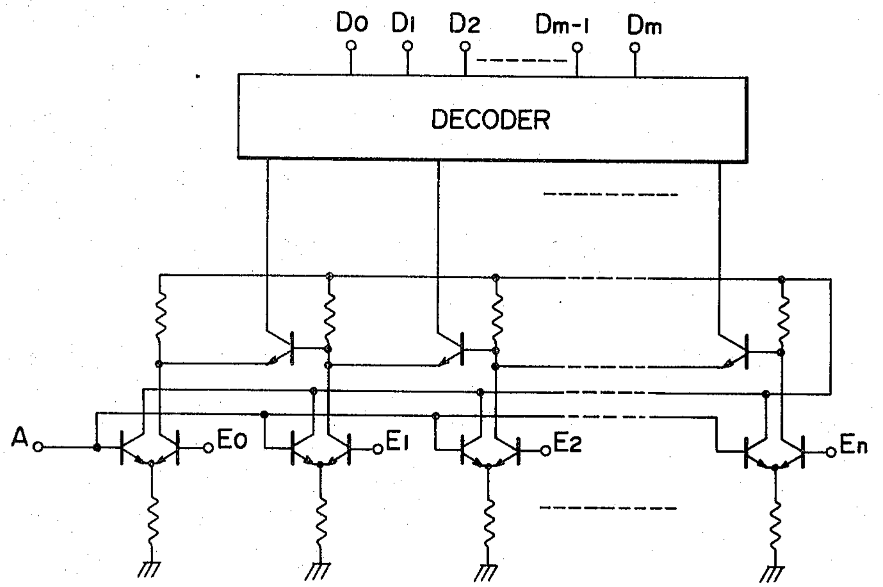
Figure 8B:
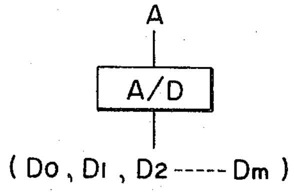

The A/D converter has a structure as shown in FIG. 8*a* and is of the parallel conversion type. A plurality of reference voltages $E_0$, $E_1$, . . . $E_n$ and an analog input signal A are applied to the A/D converter, and a plurality of digital output signals $D_0$, $D_1$, . . . $D_m$ appear from a decoder. FIG. 8*b* shows the symbol of the A/D converter shown in FIG. 8*a*, and this symbol is used in FIGS. 3 and 4.

Figure 9A:
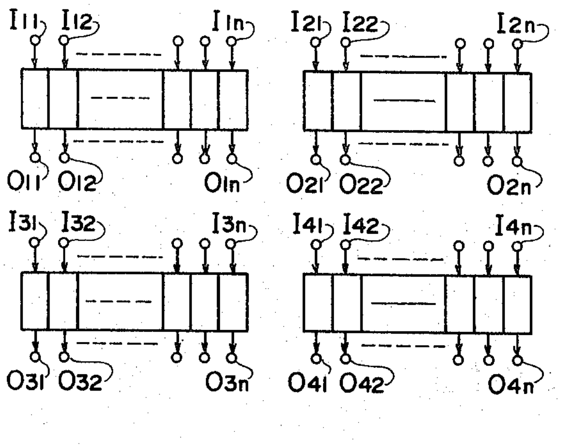
Figure 9B:
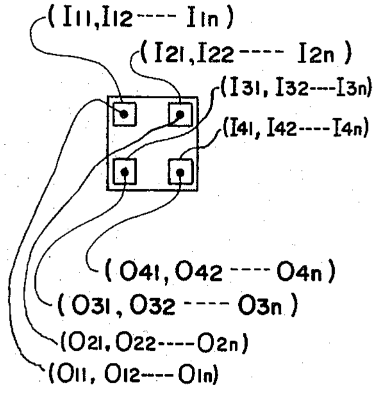

The latch register unit is a conventional digital latch register unit having a structure as shown in FIG. 9*a*. FIG. 9*b* shows the symbol of the latch register unit and this symbol is used in FIGS. 3 and 4.

In FIG. 3, the resultant pattern information consisting of 2 × 2 picture elements is shown derived after processing by the use of the mask register unit 8 having a capacity of 3 × 3 picture elements and the data register unit 13 having a capacity of 4 × 4 picture elements for the sake of convenience. However, practically, the mask register unit 8 and the data register unit 13 have respective capacities of 5 × 5 picture elements and 8 × 8 picture elements so as to obtain resultant pattern information consisting of 4 × 4 picture elements, or the mask register unit 8 and the data register unit 13 have respective capacities of 9 × 9 picture elements and 16 × 16 picture elements so as to obtain resultant pattern information of 8 × 8 picture elements. One picture element includes normally tone information of 4 to 8 bits. Suppose that one picture element consists of 4-bit tone information. Then, in the arrangement shown in FIG. 3, the number of output leads of the mask register unit 8 is (3 × 3) × 4 = 36 and digital information of "0" and "1" are applied by way of the 36 leads to the multiplier groups 15 in which each multiplier is in the form of the hybrid circuit. Similarly, the number of output leads of the data register unit 13 is (4 × 4) × 4 = 64 and digital information of "0" and "1" are applied by way of the 64 leads to the multiplier groups 16 in which each multiplier is in the form of the hybrid circuit. On the other hand, the numbers of output leads of the multiplier groups 15 and 16 are ¼ of the respective numbers above described since each output lead carries an analog signal of 4 bits (16 levels). Nine analog signals are applied to each of the four analog adders 17, 18, 19 and 20, and one analog signal appears from each analog adder. The results of the analog addition are applied to the A/D converters 21, 22, 23 and 24 connected to the respective adders 17, 18, 19 and 20 to be converted into 4-bit digital signals. Therefore, the number of input leads of a register unit 25 for storing the results of processing is actually 4 × 4 = 16.

Now, the operation of the filtering logic arithmetic unit 14 shown in FIG. 3 will be described with reference to FIG. 10 showing the relation between mask or weight information and original pattern information and with reference to FIG. 11 showing some practical examples of the weight information.

FIG. 10 is a numerical representation of the arithmetic operations carried out by the filtering logic arithmetic unit 14 shown in FIG. 3. $W_0$, $W_{01}$, . . . $W_{22}$ represent the tone information of the picture elements of the weight information stored in the mask register unit 8. $D_{00}$, $D_{01}$, . . . $D_{33}$ represent the tone information of the picture elements of original pattern information stored in the data register unit 13. Similarly, $0_{00}$, $0_{01}$, . . . $0_{11}$ represent the tone information obtained by the arithmetic operations on the weight information and original pattern information and stored in the register unit 25.

FIG. 11 shows some practical examples of the weight information employed in the embodiment shown in FIG. 3. Weight information 111 is used for "smoothing" of an original pattern. Weight information 112 is used for "addition" of two patterns. Weight information 113 and 114 are used for the "shifting" of the original pattern. Weight information 115 is used for seeking the "moment" of the original pattern. Weight information 116 is used for the "inversion" of the original pattern. Weight information 117 and 118 are used for the "contour extraction" of the original pattern. Weight information 119 is used for carrying out a correlative arithmetic operation on the weight information and original pattern information supplied from the mask register unit 8 and data register unit 13 respectively so as to detect the presence or absence of oblique lines in the original pattern.

Referring to FIG. 3 again, digital information stored in the mask register unit 8 are applied to the digital signal input terminals $D_0$ to $D_n$ of the multipliers in the multiplier groups 15 each consisting of the hybrid logic arithmetic operation circuit. An analog reference voltage is applied to the analog signal input terminal A of the multipliers in the multiplier groups 15. Therefore, analog signals are obtained by the digital-analog conversion of the digital signals applied from the mask register unit 8 and appear from the multiplier groups 15 to be applied to the analog signal input terminals of the multipliers in the multiplier groups 16 each consisting of the hybrid logic arithmetic operation circuit. On the other hand, digital signals are applied from the data register unit 13 to the digital signal input terminals of the multipliers in the multiplier groups 16. As a result, analog voltages representing the products of the analog inputs and the digital inputs, that is, the products of the digital signals applied from the mask register unit 8 and the digital signals applied from the data register unit 13 appear from the multiplier groups 16 to be added by the analog adders 17, 18, 19 and 20. The results of addition by the adders 17, 18, 19 and 20 are applied to the respective A/D converters 21, 22, 23 and 24 to be digitized thereby and the digitized information are then stored in the latch register unit 25 or buffer memory 6 (FIG. 2).

The arithmetic operations carried out in the filtering logic arithmetic unit 14 shown in FIG. 3 will be numerically described with reference to FIG. 10. Referring to FIG. 10, the following arithmetic operations are carried out in the embodiment shown in FIG. 3:

$$O_{mm}=\sum_{i,j=0}^{2} W_{ij}D_{i+m,\,j+n}$$

where $0 \leqq m, n \leqq 2$ and $W_{ij}$, $D_{ij}$ and $0_{ij}$ represent the content of the mask register unit 8, the content of the data register unit 13, and the tone information of the resultant pattern information obtained by processing according to the filtering logic respectively.

Therefore, "smoothing" of the original pattern can be carried out when weight information as shown by 111 in FIG. 11 is stored in the mask register unit 8. When a standard pattern is employed, the correlation between the standard pattern and the original pattern can be detected. When weight informtion as shown by 112 in FIG. 11 is employed, superposition or "addition" of the unit pattern [$D_{00}$, $D_{01}$, $D_{10}$, $D_{11}$] and the unit pattern [$D_{02}$, $D_{03}$, $D_{12}$, $D_{13}$] can be carried out. Further, the original pattern can be shifted to the right by the use of weight information as shown by 113 in FIG. 11 and can be shifted to the right and downward by the use of weight information as shown by 114 in FIG. 11. Further, computation of the moment can be carried out by the use of weight information as shown by 115 in FIG. 11 as described previously. Furthermore, after applying weight information as shown by 116 in FIG. 11 to the original pattern, a predetermined value may be added to all the picture elements to obtain an inverted pattern. Contour extraction can be carried out by adding the absolute values of the result of processing with weight information 117 to the absolute values of the result of processing with weight information 118. When weight information 119 is used, the values representative of the correlation between the weight information and the original pattern information can be sought, and thus, oblique lines in the original pattern can be detected. It will be seen that the weight information may be set at various values as above described so as to facilitate extraction of the corresponding features of the original pattern.

EMBODIMENT 2

Another form of the filtering logic arithmetic unit 14 in the processor according to the present invention will be described with reference to FIG. 4 in which like reference numerals and symbols are used to denote like parts appearing in FIG. 3. In FIG. 4, adders 26 are adapted for special operation and this operation will be described in detail with reference to FIGS. 5 and 12.

Figure 5A:
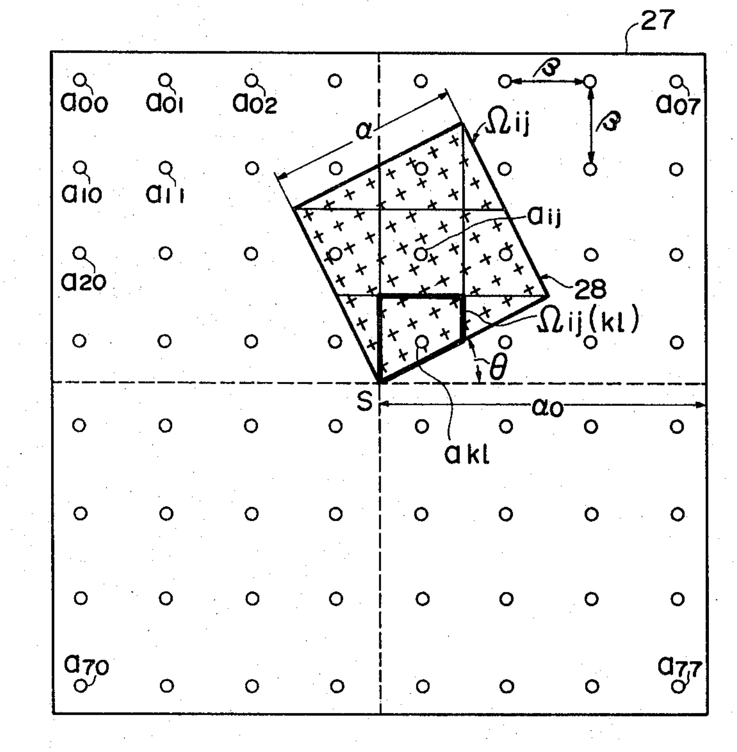
Figure 5B:
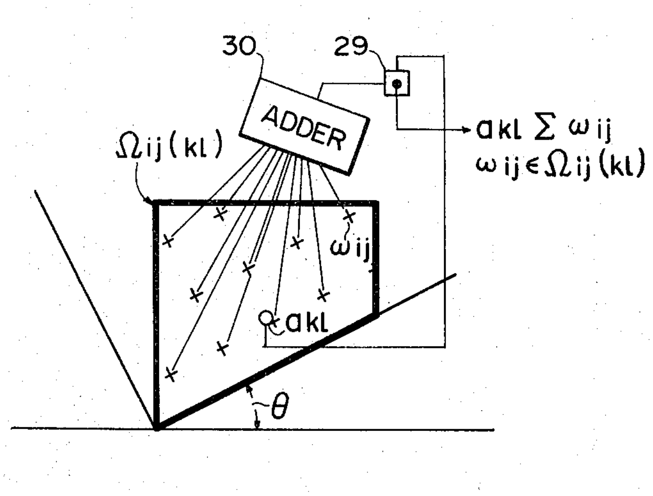

FIG. 5*a* shows the relation between weight information and original pattern information, and FIG. 5*b* is an enlarged view showing functionally a part (thick line portion) of FIG. 5*a*. This portion is designated by $\Omega ij$. Referring to FIG. 5*a*, the reference numeral 27 designates original pattern information consisting of 8 × 8 picture elements, and $a_{00}$, $a_{01}$, . . . $a_{77}$ represent the relative tones of the picture elements. The reference numeral 28 designates weight information stored in and supplied from the mask register unit 8. This weight information 28 is contracted to $\alpha/\alpha 0$ of the original size and is rotated through an angle of $\theta$. This weight information 28 is situated around $a_{ij}$, and sixteen weight information are prepared, to be situated around $a_{22}$, $a_{23}$, $a_{24}$, $a_{25}$, $a_{32}$, $a_{33}$, . . . $a_{55}$ respectively so as to obtain a resultant pattern consisting of 4 × 4 picture elements. In FIG. 4, four weight information are prepared so as to obtain a resultant pattern consisting of 2 × 2 picture elements.

The function of the weight information on the portion $\Omega_{ij}$ in FIGS. 5*a* and 5*b* will now be described. The portion $\Omega_{ij}$ is formed in a manner which will be described below. Referring to FIG. 5*a*, the weight information 28 is situated so that the left-hand lower corner thereof coincides with the center S of the original pattern information 27 consisting of 8 × 8 picture elements. Then, the weight information 28 is rotated through an angle of $\theta$ and is contracted to $\alpha/\alpha 0$ of the original size so that the center thereof coincides with $a_{ij}$. The picture elements of the weight information 28 after the above rotation and contraction are shown by the symbol X. The picture elements of the weight information 28 are designated by $W_{00}$, $W_{01}$, . . . $W_{88}$ starting from the left-hand upper corner thereof. Then, a lattice having respective sides $\beta$ is formed around $a_{kl}$ covered by the portion $\Omega_{ij}$, and the range lying within this lattice and covered by the portion $\Omega_{ij}$ is designated by $\Omega_{ij(kl)}$. In this case, the following arithmetic operation (described later) is carried out on each portion $\Omega_{ij}$:

$$O_{ij}=\Sigma\ [a_{ij}(\Sigma W_{ij})]$$

where $a_{ij} E\ \Omega_{ij}$, $W_{ij} E \Omega_{ij}(kl)$

A means for carrying out such an arithmetic operation is shown in FIG. 5*a*. Referring to FIG. 5*b*, an adder 30 computes $\Sigma\ W_{ij}$ and a multiplier 29 in the form of a hybrid circuit computes the product of the pattern information $a_{kl}$ and the weight information $\Sigma W_{ij}$. It is to be understood that the adder 30 and the multiplier 29 represent one of the adders in the adder group 26 and one of the multiplier groups 16 shown in FIG. 4.

FIG. 12 shows some practical examples of weight information employed in the filtering logic arithmetic unit 14 shown in FIG. 4. Weight information 121, 122, 123, 124 and 125 are used for the concentration of original pattern information to ½ of the original size, expansion of the original pattern information to two times the original size, rotation of the original pattern information through about 45°, rotation and contraction of the original pattern information, and detection of radial lines in the original pattern information respectively.

Referring to FIG. 4 again, a mask register unit 8 consisting of a plurality of latch registers supplies digital information to a plurality of multiplier groups 15 of hybrid circuitry and such digital informatiom are converted into analog information by the multiplier groups 15. The adders in the adder group 26 have the same structure as that of the adders 17, 18, 19 and 20 shown in FIG. 3. The multiplier groups 16 of hybrid circuitry carry out arithmetic operations for obtaining the products of the results of addition by the adder group 26 and the original pattern information supplied from the data register unit 13. Thus, the output of the adder group 26 is given by $\Sigma W_{ij} = W_{00} + W_{01} + W_{10} + W_{11}$, where $W_{ij}$ E $\Omega_{ij}(kl)$. In FIG. 4, a portion of the multiplier groups 16 is merely shown for the sake of simplicity. The analog output voltages of the multiplier groups 16 are digitized by a plurality of A/D converters 21, 22, 23 and 24 to be stored in a latch register unit 25 or in the buffer memory 6 (FIG. 2). Actually, the output voltages of the multiplier groups 16 are added by adders disposed in dotted line portions in FIG. 4 and are then subjected to the A–D conversion. These adders are not shown in FIG. 4 for the sake of simplicity. The signal stored in the latch register unit 25 is given by $O_{ij} = \Sigma[a_{ij}(\Sigma W_{ij})]$ where $a_{ij}$ E $\Omega_{ij}$, $W_{ij}$ E $\Omega_{iij}(kl)$ Although weight information consisting of 2 × 2 picture elements and original pattern information consisting of 4 × 4 picture elements are shown for the sake of simplicity in FIG. 4, weight information consisting of 4 × 4 picture elements and original pattern information consisting of 8 × 8 picture elements are actually required at the least. Thus, actually, resultant pattern information of 4 × 4 picture elements is obtained from the weight information of 4 × 4 picture elements supplied from the mask register unit 8 and the original pattern information of 8 × 8 picture elements supplied from the data register unit 13. Or else, resultant pattern information of 8 × 8 picture elements is obtained from the weight information of 8 × 8 picture elements supplied from the mask register unit 8 and the original pattern information of 16 × 16 picture elements supplied from the data register unit 13.

Suppose that the weight information consisting of, for example, 4 × 4 picture elements are used in this embodiment. Then, it is possible to contract the size of the original pattern information to ½ of the original size by the use of the weight information 121. The original pattern information can be expanded to two times the original size by the use of the weight information 122. The original pattern information can be rotated in the right-hand direction through about 45° by the use of the weight information 123. The original pattern information can be contracted to ½ of the original size and can be rotated in the right-hand direction through about 45° by the use of the weight information 124. Radial lines in the original pattern information can be detected by the use of the weight information 125. Thus, by suitably selecting the weight information of various values, it is possible to extract the corresponding features.

It will be seen from the above description that, according to the first and second embodiments of the present invention, various arithmetic operations for the processing of pattern information can be carried out by the same arithmetic unit when the content of the mask register unit is renewed by suitable weight information supplied from the memory as required. Further, due to the fact that the arithmetic unit includes the hybrid arithmetic operation circuits in which digital signals are applied to the terminals connected to the digital memory elements such as the registers and memory and analog signals are applied to the remaining terminals, the arithmetic unit can be easily constructed with a minimum of assembling steps for actual installation, and thus a universal pattern recognition processor can be obtained at low costs.

EMBODIMENT 3

This embodiment differs from the first and second embodiments in that weight information used herein differs in shape from that stored in the mask register unit 8 shown in FIG. 2. Other parts of the processor are the same as those of the first and second embodiments. In the first and second embodiments, weight information which is square in planar shape has been employed. However, such square-shaped weight information includes unnecessary information for carrying out rotation, expansion or contraction of pattern information, and as a result, the arithmetic unit also includes unnecessary circuits. Weight information employed in the present embodiment has a shape which does not include these unnecessary information.

FIG. 13 shows a planar shape of weight information preferably employed in the present embodiment for obtaining resultant pattern information 39 shown in FIG. 14. The weight information shown in FIG. 13 comprises a central picture element 32 which coincides with a corresponding picture element of four-unit original pattern information 38 shown in FIG. 14. The remaining picture elements of the weight information are designated by the reference numeral 33. The reference numeral 34 designates an end point which coincides with the center point 37 of the four-unit original pattern information 38 shown in FIG. 14. A pair of concentric partial circles 31 are drawn around the end point 34 to pass through opposite ones of the corners of the central picture element 32 of the weight information, and a straight line 35 passes throgh the central picture element 32 and intersects the partial circles 31 at right angles.

The weight information employed in the present embodiment has a size corresponding to one unit consisting of 8 × 8 picture elements. As shown in FIG. 13, the weight information is composed of the central picture element 32, the picture elements lying along the partial circles 31 drawn around the end point 34 and passing through opposite ones of the corners of the central picture element 32, the picture elements lying along the straight line 35 passing through the central picture element 32 and intersecting the partial circles 31 at right angles, and the picture elements disposed adjacent to the above picture elements.

The picture elements lying along the partial circles 31 are required for rotation of the original pattern information, while the picture elements lying along the straight line 35 and those adjacent to these picture elements are required for expansion or contraction of the original pattern information. Any other picture elements are unnecessary for various kinds of processing by the processing system.

FIG. 14 shows diagrammatically the arithmetic operations carried out in the filtering logic arithmetic unit 14. The weight information employed in the presentembodiment is designated by the reference numeral 36 and is shown by a hatched square planar shape for the sake of simplicity. As seen in FIG. 14, the end point 34 of the weight information 36 is always situated to coincide with the center point 37 of the four-unit original pattern information 38 and the central picture element 32 of the weight information 36 is situated to coincide with the desired picture element in the resultant pattern information 39. In this state, the products of the picture elements of the pattern information 38 and the weight information 36 are sought, and then the sum of these products is taken to obtain the result. Thus, the arithmetic operations on the 8 × 8 picture elements forming one unit can be parallelly carried out in the filtering logic arithmetic unit 14.

The pattern information stored in the pattern data registers 9, 10, 11 and 12 and the weight information stored in the mask register unit 8 are subjected to the arithmetic operations in the manner shown in FIG. 14 in the filtering logic arithmetic unit 14. Thereafter, the resultant pattern information 39 may be subjected to the non-linear arithmetic operation in the non-linear arithmetic unit 50 when so required, and finally, the results are stored in the buffer memory 6.

Referring to FIG. 14 again, the relation between the weight information 36 and the original pattern information 38 is such that the planar shape of the weight information 36 is successively reduced while retaining the same content therein as the weight information 36 is moved toward the center point 37 of the original pattern information 38. Thus, there occurs a case in which a plurality of picture elements of the weight information 36 are present around a single picture element of the pattern information 38 as shown in FIG. 15.

FIG. 15 shows the relation between the weight information 36 and the four-unit original pattern information 38 during processing for seeking a picture element in the vicinity of the center of the resultant pattern information 39. The picture elements constituting the original pattern information 38 are designated by the reference numeral 40, while those constituting the weight information 36 are designated by the reference numeral 41.

In the situation shown in FIG. 15, the picture elements 41 of the weight information 36 existing within a square-shaped region 45 surrounding one picture element 40 of the original pattern information 38 are added together to obtain weight information to be multiplied by the picture element 40 of the original pattern information 38 as shown in FIG. 16. FIG. 16 is an enlarged view of a part of the relation shown in FIG. 15, and shows a part of circuitry for carrying out the arithmetic operations above described. Referring to FIG. 16, each square-shaped region 45 includes one picture element 40 of the original pattern information 38, and the picture elements 41 existing within this square-shaped region 45 are added together by the adder 42. A multiplier 43 multiplies the picture element 40 of the original pattern information 38 by the output of the adder 42. An adder 44 adds the products appearing from the multipliers 43 and an output signal R representative of the resultant picture element information is delivered from the adder 44. Any detailed description as to these arithmetic operations is unnecessary as such have already been described in detail with reference to FIG. 5 illustrative of the second embodiment of the present invention.

$D(x, y)$, $W(i, j)$ and $R(x_o, y_o)$ shown in FIG. 17 represent the coordinate systems of the four-unit original pattern information 38, weight information 36, and resultant one-unit pattern information 39 derived from the filtering logic arithmetic unit 14 respectively. When the coordinates $i$ and $j$ of the picture elements of the weight information 36, the coordinates $x$ and $y$ of the picture elements of the four-unit original pattern information 38 and the coordinates $x_o$ and $y_o$ of the resultant one-unit pattern information 39 are determined in the manner shown in FIG. 17, the coordinates $x$ and $y$ representative of the position of one picture element $W(i, j)$ of the weight information 36 on the plane of the original pattern information 38 are given by $$x(i, j) = -1/7\{i\cdot(x_o + y_o - 7) + j\cdot(x_o - y_o) - 15\cdot x_o\}$$

$$y(i, j) = 1/7\{i\cdot(x_o - y_o) + j\cdot(x_o + y_o - 7) + 15\cdot y_o\}$$

where $x_o$, $y_o$, $i$ and $j$ are integers, $0 \leq i, j \leq 7$, $0 \leq x_o, y_o \leq 7$. From the above equations, the arithmetic operations carried out in the filtering logic arithmetic unit 14 for seeking the picture elements $R(x_o, y_o)$ of the resultant pattern information are expressed as $$R(x_o, y_o) = \sum_{i=0}^{7}\sum_{j=0}^{7}\{W(i, j)\cdot D([x(i, j)+0.5], [y(i, j)+0.5])\}$$

FIG. 18 shows in block diagram a part of circuitry of the filtering logic arithmetic unit 14 (FIG. 2) for carrying out the arithmetic operations above described. More precisely, FIG. 18 shows a part of the filtering logic arithmetic unit 14 shown in FIG. 4. Referring to FIG. 18, a plurality of adders 42 as shown in FIG. 16 are provided for carrying out the addition of the picture elements of weight information stored in the mask register unit 8. An adder group 49 constituted by these adders 42 corresponds to the adder group 26 shown in FIG. 4. A plurality of multipliers 43 constitute a multiplier group 48 which corresponds to the multiplier group 16 shown in FIG. 4. These multipliers 43 are connected to an adder 44 which is not shown in FIG. 4.

The adder group 49 generates weight information to be multiplied by original pattern information and the number of the adders 42 therein is equal to the number of picture elements of the original pattern information participating in the arithmetic operations for obtaining the picture elements of the resultant information by multiplication with the picture elements of the weight information. It is to be noted that, when the weight information has a shape as shown in FIG. 13 instead of a square shape, the total number of the required adders 42 can be reduced to about one-half of the number required when the weight information has the square shape. The multiplier group 48 and the adder 44 constitutes an operator group 47 for obtaining the products and the sum of the products. Thus, one-to-one multiplication between the modified weight information produced from the adder group 49 and the original pattern information is carried out in the multiplier group 48, and the products thus obtained are added together in the adder 44 to obtain one picture element $R(x_o, y_o)$ of the resultant information. The number of the multipliers 43 constituting the multiplier group 48 is equal to the number of picture elements of the original pattern information participating in the arithmetic operations for obtaining the picture elements of the resultant information by multiplication with the picture elements of the weight information. It is to be noted that the total number of the required multipliers 43 when the weight information has the shape shown in FIG. 13 can be reduced to about one-half of the number required when the weight information has the square shape.

FIG. 19 shows some practical examples of the weight information employed in the present embodiment. Original pattern information can be rotated counterclockwise through 30° by the use of weight information 191 and can be rotated clockwise through 30° by the use of weight information 192. The original pattern information can be rotated clockwise through about 45° by the use of weight information 193. The original pattern information can be contracted to one-half the original size by the use of weight information 194 as when it is sampled, while the original pattern information can be contracted to one-half of the original size by the use of weight information 195 as when the arithmetic mean is sought. Further, the original pattern information can be expanded to two times the original size by the use of weight information 196. Various other weight information may be employed for extracting various features of the original pattern information.

It will be understood from the above description that the weight information is composed of a central picture element, a plurality of picture elements lying along a pair of concentric partial circles drawn around one of the end points of the weight information and passing through opposite ones of the corners of the central picture element, a plurality of picture elements lying along a straight line passing through the central picture element and intersecting the partial circles at right angles, and a plurality of picture elements disposed adjacent to the above picture elements. The use of the weight information having such a planar shape is advantageous over that of square planar shape in that the total number of the adders and multipliers forming the essential parts of the filtering logic arithmetic unit 14 in the processor according to the present invention can be reduced to about one-half of the number required with square weight information, and yet, the space coordinate transformation such as rotation, expansion or contraction of original pattern information or extraction of geometrical features of the original pattern information can be carried out quite inexpensively and effectively without in any way reducing the ability of processing.

EMBODIMENT 4

The present embodiment differs from the third embodiment in the shape of weight information or mask information stored in the mask register unit 8. FIG. 20 is a view similar to FIG. 1, but shows the relation between two kinds of original pattern information and resultant information obtained after processing in a manner as will be described later. Referring to FIG. 20*a*, two frames 51 of original pattern information includes unit pattern information 53 and 54 respectively in a plurality of units 52 to be processed by the processor according to the present invention. Referring to FIG. 20*c*, resultant information 56 includes unit information 57 obtained at a time by parallel processing of the unit pattern information 53 and 54 by the use of weight information employed in the present embodiment. Each unit consists of 8 × 8 picture elements each including tone information of different levels. In the first, second and third embodiments of the present invention, four-unit original pattern information is required for processing. In the present embodiment, however, the unit pattern information 53 and 54 are disposed in a manner as shown in FIG. 20*b* and are superposed to obtain the resultant unit information 57 shown in FIG. 20*c*.

The operation shown in FIGS. 20*a* to 20*c* will be described with reference to FIG. 2. The unit pattern information 53 and 54 are derived from the two kinds of original pattern information stored in the buffer memory 6 and are set in the respective pattern data registers 9 and 10. Weight information is set in the mask register unit 8. The pattern information stored in the pattern data registers 9 and 10 and the weight information stored in the mask register unit 8 are then subjected to multiplication and addition in the filtering logic arithmetic unit 14. Subsequently, the outputs of the filtering logic arithmetic unit 14 may be subjected to the non-linear arithmetic operation in the non-linear arithmetic unit 50 when so required, and finally, the results are applied to a control circuit network 60. As shown in FIG. 21, weight information 64 employed in the present embodiment has a shape such that weight information 66 corresponding to one picture element is added to the upper right-hand and of square-shaped weight information 65 consisting of 8 × 8 picture elements 67.

FIG. 22 shows diagrammatically the arithmetic operations carried out in the filtering logic arithmetic unit 14. As described previously, according to the filtering logic, the weight information 64 is superposed on the four-unit original pattern information 55 including two kinds of unit original pattern information 53 and 54 and is successively moved by one picture element relative to the original pattern information in both the longitudinal and lateral directions, and the products of the corresponding picture elements of the weight information and the original pattern information are successively detected, the total sum of the products being then computed to obtain the results. In this case, there are 64 states of superposition between the the four-unit original pattern information 55 and the weight information 64. Thus, the filtering logic arithmetic unit 14 includes 64 circuit networks for carrying out the arithmetic operations for obtaining the products and the sum of these products so that the 8 × 8 picture elements in the resultant unit information 57 can be simultaneously obtained.

$D(x, y)$, $W(i, j)$ and $R(i_o, j_o)$ shown in FIG. 24 represent the coordinate systems of the four-unit original pattern information 55, weight information 64 and resultant unit pattern information 57 respectively. When the coordinates $i$ and $j$ of the picture elements of the weight information 64, the coordinates $x$ and $y$ of the picture elements of the four-unit original pattern information 55, and the coordinates $i_o$ and $j_o$ of the picture elements of the resultant unit pattern information 57 are determined in the manner shown in FIG. 24, the arithmetic operations carried out in the filtering logic arithmetic unit 14 for seeking the picture elements $R(i_o, j_o)$ of the resultant information 57 are expressed as $$R(i_o, j_o = \sum_{i=0}^{7} \sum_{j=0}^{7} W(i, j) \cdot D(i_o+i, j_o+j) + W(8, 0) \cdot D(i_o+8, j)$$

where $0 \leqq i_o, j_o \leqq 7$.

FIG. 23*b* shows in block diagram a part of circuitry of the filtering logic arithmetic unit 14 for carrying out the arithmetic operations above described. A plurality of multipliers 69 and an adder 70 constitute an operator group 68. Although a number of such operator groups 68 are provided in the filtering logic arithmetic unit 14, the remaining groups 68 are not shown for the sake of simplicity. Further, any detailed description as to these multipliers and adders is unnecessary in view of the detailed description given hereinabove.

The function of the weight information 64 employed in the present embodiment will be described in more detail with reference to FIGS. 23*a* and 23*b*. The arithmetic operations will be briefly described with reference to the case in which the original pattern information 55 and the weight information 64 have a relation as shown in FIG. 23*a*. The weight information 64 is stored in the mask register unit 8, and the four-unit original pattern information 55 is set in the data registers 9, 10, 11 and 12. In the state shown in FIG. 23*a*, some of the picture elements of the four-unit original pattern information 55 are superposed by the weight information 64, and picture element information derived from the corresponding picture elements of the original pattern and weight information are applied to the multipliers 69 which deliver the products. The number of the multipliers 69 is equal to the number of the picture elements of the weight information 64. Thus, there are 65 multipliers 69 and 65 products can be simultaneously obtained. The outputs of the 65 multipliers 69 are applied to the adder 70 which produces the sum corresponding to one picture element information of the resultant pattern information 57. The filtering logic arithmetic unit 14 includes 64 operator groups 68 each consisting of 65 multipliers 69 and one adder 70 so as to obtain the resultant information. The 57 consisting of 8 × 8 picture element information. The employment of the weight information having a shape as shown in FIG. 21 is advantageous in that the number of the multipliers 69 can be reduced by 1,024 as compared with the case in which the weight information has a square shape and yet the superposition of original pattern information for the purpose of addition or subtraction can be facilitated without impairing the ability of space coordinate transformation such as rotation, expansion or contraction.

FIG. 25 shows some practical examples of the weight information 64 employed in the present embodiment. The function of these weight information will now be described. The two kinds of unit original pattern information 53 and 54 are set in a manner as shown in FIG. 20b in the four-unit data register unit 13. When weight information 251 shown in FIG. 25 is used in conjunction with such unit original pattern information 53 and 54, the addition or superposition of the unit original pattern information 53 and 54 can be carried out. When weight information 252 is used, the arithmetic operation (unit original pattern information 53 minus unit original pattern information 54) can be carried out. Similarly, the arithmetic operation (unit original pattern information 54 minus unit original pattern information 53) can be carried out by the use of weight information 253. Further, expansion, contraction, rotation, etc. described previously can be carried out by the use of suitable weight information.

EMBODIMENT 5

FIG. 26 shows a two-dimensional shape of weight information employed in the present embodiment. Referring to FIG. 26, the weight information 64 has a shape such that weight information 66, 73 and 74 each corresponding to one picture element are added to the upper right-hand end, lower right-hand end and lower left-hand end respectively of square-shaped weight information 64 consisting of 8 × 8 picture elements. Four kinds of unit original pattern information 53, 54, 75 and 76 to be superposed are set in the respective data registers 9, 10, 11 and 12 in a manner as shown in FIG. 27. In the filtering logic arithmetic unit 14, each operator group 68 for seeking one picture element information of the resultant information is composed of 67 multipliers 69 and one adder 70 as shown in FIG 28, and the filtering logic arithmetic unit 14 includes 64 operator groups 68 so as to simultaneously obtain the resultant information consisting of 8 × 8 picture element information. The employment of the weight information having a shape as shown in FIG. 26 is advantageous in that the number of the multipliers 69 can be reduced by 896 as compared with the case in which the weight information has a square shape and yet the ability of space coordinate transformation such as rotation, expansion or contraction as well as the superposition of original pattern information is not impaired at all.

FIG. 29 shows some practical examples of the weight information 64 empooyed in the present embodiment. The four kinds of unit original pattern information 53, 54, 75 and 76 to be superposed are set in the respective data registers 9, 10, 11 and 12 in the manner shown in FIG. 27. When weight information 291 as shown in FIG. 29 is used in conjunction with such unit original pattern information 53, 54, 75 and 76, the addition or superposition (unit original pattern information 53 plus unit original pattern information 54 plus unit original pattern information 75 plus unit original pattern information 76) can be carried out. The superposition (unit original pattern information 53 minus unit original pattern information 54 plus unit original pattern information 75 plus unit original pattern information 76) can be carried out by the use of weight information 292. Similarly, the superposition (unit original pattern information minus unit original pattern information 54 minus unit original pattern information 75 plus unit original pattern information 76) and the superposition (unit original pattern information 53 minus unit original pattern information 54 minus unit original pattern information 75 minus unit original pattern information 76) can be carried out by the use of weight information 293 and 294 respectively. Naturally, other processing described previously can be carried out in the same manner.

It will thus be understood that, by the employment of weight information of such a two-dimensional shape having a plurality of picture element information added to weight information of square shape, the superposition of original pattern information such as addition and subtraction in addition to the desired pattern recognition processing can be very easily, inexpensively and effectively attained.

We claim:

1. A multi-dimensional pattern recognition processor comprising a pattern data register unit for storing information of individual picture elements of a multi-dimensional original pattern, a mask register unit for designating a multi-dimensional weight information pattern applied to the pattern information of the individual picture elements of the original pattern, a plurality of multiplier groups for simultaneously carrying out the multiplication on all the picture elements of the original pattern such that pattern information signals representative of the picture elements of the original pattern derived from said pattern data register unit are multiplied by weight information signals derived from the corresponding picture element portions of said mask register unit, and a plurality of adders each associated with one of said multiplier groups for carrying out the addition of the results of multiplication by said multiplier groups, wherein weight information stored in said mask register unit is changed to various forms so that said original pattern information can be suitably processed depending on said changed weight information.

2. A multi-dimensional pattern recognition processor as claimed in claim 1, wherein a non-linear arithmetic unit is additionally provided for selecting solely the signals having a level higher than a predetermined threshold value from the output signals of said adders.

3. A multi-dimensional pattern recognition processor as claimed in claim 1, wherein said weight information pattern comprises a plurality of picture elements lying along one diagonal of a square and lying along a partial circle drawn around one of the ends of said diagonal so as to pass through the center of said square, and a plurality of picture elements adjoining to said picture elements along said diagonal and said partial circle, said partial circle being defined in the area of said square.

4. A multi-dimensional pattern recognition processor as claimed in claim 1, wherein said weight information pattern comprises a plurality of picture elements arranged in the shape of a square with at least one picture element added to a side of said square.

5. A multi-dimensional pattern recognition processor as claimed in claim 1, wherein said weight information pattern comprises a plurality of picture elements arranged in a square with at least one picture element added to each of two sides of the square and at least one additional picture element added to at least one corner of the square in the direction of a diagonal of the square.

6. A multi-dimensional pattern recognition processor comprising a pattern data register unit for storing information of individual picture elements of a multi-dimensional original pattern, a mask register unit for designating the weight applied to the pattern information of the individual picture elements of the original pattern, a plurality of hybrid multiplier groups connected to said register units for computing the product of two input signals representative of a multiplier and a multiplicant one of which is a digital signal and the other of which is an analog signal, a plurality of analog adder groups each connected to one of said hybrid multiplier groups for carrying out the addition of an addend and a summand both of which are analog signals, and a group of analog to digital converters each converting the analog output signal of one of said adder groups into a digital signal, wherein the weight information stored in said mask register unit is changed to various forms so that said pattern information can be suitably processed depending on said changed weight information.

7. A multi-dimensional pattern recognition processor as claimed in claim 6, wherein a non-linear arithmetic unit is connected between said analog adder groups and said analog to digital converter group so as to select solely the analog signals having a level higher than a predetermined threshold value from the analog output signals of said analog adder groups.

* * * * *